US007027955B2

(12) United States Patent
Markwitz et al.

(10) Patent No.: US 7,027,955 B2
(45) Date of Patent: Apr. 11, 2006

(54) GUARD TOUR SYSTEM INCORPORATING A POSITIONING SYSTEM

(75) Inventors: Barry J. Markwitz, Solon, OH (US); Dean Chriss, Wickliffe, OH (US)

(73) Assignee: TimeKeeping Systems, Inc., Solon, OH (US)

( * ) Notice: Subject to any disclaimer, the term of this patent is extended or adjusted under 35 U.S.C. 154(b) by 0 days.

(21) Appl. No.: 10/279,694

(22) Filed: Oct. 24, 2002

(65) Prior Publication Data

US 2003/0040888 A1 Feb. 27, 2003

Related U.S. Application Data

(63) Continuation-in-part of application No. 09/419,475, filed on Oct. 15, 1999, now Pat. No. 6,834,259.

(51) Int. Cl.
*G06F 15/00* (2006.01)

(52) U.S. Cl. ...................................... 702/187; 235/385

(58) Field of Classification Search ............ 702/81–84, 702/108, 122, 182–185, 187–188; 235/375, 235/376, 382, 462.01, 383, 385; 340/5.71, 340/5.06, 825.27, 825.49, 825.36, 306
See application file for complete search history.

(56) References Cited

U.S. PATENT DOCUMENTS

| | | | |
|---|---|---|---|
| 3,736,561 A | 5/1973 | Rumpel | |
| 3,781,845 A | 12/1973 | Ellul | |
| 3,959,633 A | 5/1976 | Lawrence et al. | |
| 3,990,067 A | 11/1976 | Van Dusen et al. | |
| 4,086,577 A | 4/1978 | Elgersma | |
| 4,672,654 A | 6/1987 | Vanacore | |
| 4,800,590 A | 1/1989 | Vaughan | |
| 4,850,009 A | 7/1989 | Zook et al. | |
| 4,857,883 A * | 8/1989 | Mama | 340/7.54 |

(Continued)

FOREIGN PATENT DOCUMENTS

JP 2000235660 A * 8/2000

(Continued)

OTHER PUBLICATIONS

Timekeeping Systems, Inc., "Guard1—Guard Tour System for WIndows 3.1 and Windows 95/98 Version 1.2," User's Guide, TimeKeeping Systems, Inc., Cleveland, Ohio, 86 pages, (Sep. 1998).

(Continued)

*Primary Examiner*—Carol S.W. Tsai
(74) *Attorney, Agent, or Firm*—James A. Hudak

(57) ABSTRACT

A guard tour system comprising a computer running a computer program that enables a variety of electronic hardware components to function as the guard tour system. It is contemplated that the computer program be multi-user and/or network compatible. The electronic hardware includes one or more touch button readers, or one or more positioning system receivers (such as a global or local positioning system receiver), or both; one or more downloaders for use with the touch button readers and global positioning system receivers; and optionally a plurality of touch memory buttons located along a guard tour. Each touch memory button includes preprogrammed information specific to its particular location. As a guard or night watchman progresses through the guard tour he or she either obtains a global positioning system location reading manually or automatically or reads the information stored within each touch memory button or both, using a hand-held, battery operated reader. The Global Positioning System allows for collection of various guard positioning information.

30 Claims, 16 Drawing Sheets

U.S. PATENT DOCUMENTS

| | | | | |
|---|---|---|---|---|
| 5,120,942 | A | 6/1992 | Holland et al. | |
| 5,399,844 | A | 3/1995 | Holland | |
| 5,467,074 | A | 11/1995 | Pedtke | |
| 5,541,845 | A | 7/1996 | Klein | |
| 5,572,192 | A | 11/1996 | Berube | |
| 5,572,195 | A | 11/1996 | Heller et al. | |
| 5,623,258 | A | 4/1997 | Dorfman | |
| 5,751,245 | A | 5/1998 | Janky et al. | |
| 5,808,564 | A | 9/1998 | Simms et al. | |
| 5,819,227 | A | 10/1998 | Obuchi | |
| 5,825,283 | A | 10/1998 | Camhi | |
| 6,078,255 | A * | 6/2000 | Dividock et al. | 340/539.1 |
| 6,172,657 | B1 * | 1/2001 | Kamakura et al. | 345/8 |
| 6,239,700 | B1 | 5/2001 | Hoffman et al. | |
| 6,526,351 | B1 * | 2/2003 | Whitham | 701/211 |
| 2002/0089434 | A1 * | 7/2002 | Ghazarian | 340/988 |
| 2002/0128769 | A1 * | 9/2002 | Ghazarian et al. | 701/207 |
| 2002/0143934 | A1 * | 10/2002 | Barker et al. | 709/224 |
| 2002/0143938 | A1 * | 10/2002 | Alexander et al. | 709/224 |
| 2003/0009281 | A1 * | 1/2003 | Whitham | 701/211 |
| 2003/0182052 | A1 * | 9/2003 | DeLorme et al. | 701/201 |
| 2003/0206099 | A1 * | 11/2003 | Richman | 340/506 |

FOREIGN PATENT DOCUMENTS

| | | | |
|---|---|---|---|
| JP | 2002073740 | A * | 3/2002 |
| JP | 2002109659 | A * | 4/2002 |

OTHER PUBLICATIONS

Global Positioning System Overview, by Peter H. Dana, The Geographer's Kraft Project, Department of Geography, The University of Colorado at Boulder, 12 pages (double-sided) (Revised May 1, 2000).

M-LOC MPM Module From Trimble, website http://www.trimble.com/mlocmpm.html (Jan. 2, 2002).

* cited by examiner

GUARD1 PLUS CLIENT/ FACILITY/GROUP/LOCATION HIERARCHY (400-416)

CONT'D FROM FIG.5

GUARD1 PLUS HARDWARE DEVICES HIERARCHY (418–424)

MAKING A TOUR (146–166)

DOWNLOADING (CONTINUED)

PRINT REPORTS, BASIC & CUSTOM (208–232)

BATCH REPORTS (234–240)

RULES (308-328)

GUARD TOUR SYSTEM INCORPORATING A POSITIONING SYSTEM

This application is a Continuation-in-Part of Ser. No. 09/419,475 filed Oct. 15, 1999 now U.S. Pat. No. 6,834,259. Application Ser. No. 09/419,475 is hereby incorporated by reference herein.

TECHNICAL FIELD

The current invention relates to an improved guard tour monitor system. More specifically, the present invention relates to a system comprised of electronic hardware and software, that insures that patrol guards or officers monitor all desired areas of one or more buildings or property. In an embodiment, the system includes a positioning system which is used to acquire location and other information into the data acquired.

BACKGROUND OF THE INVENTION

At one time, guard tour systems consisted of mechanical clocks which used paper tape recording systems to time-stamp events of a tour. Another type of prior art guard tour system includes a bar code reader that is formed into a portable, hand-held device. Attached to each checkpoint are bar code labels. The guard or night watchman then walks around to each checkpoint and scans in the associated bar code label with the hand-held device. After completing the tour the guard then transmits the recorded list of bar code readings and time-stamps to a report-generating computer.

Prior art guard tour systems also required guards to follow strict route requirements during the tours. Usually, once the tour began, the guard had to progress through the tour according to a predefined sequence of checkpoints so that the progress and location of the guard was always known. However, this arrangement can be counterproductive. Observers may be able to ascertain the guard's predetermined tour sequence and plan a break in based on that sequence. These systems also require that the guard proceed to each checkpoint in a predetermined amount of time. This does not allow the guard any flexibility to investigate unusual occurrences he encounters during the tour, because he must proceed to the next checkpoint.

Other prior art guard tour systems required that the guard type in any incidents encountered during the tour into a log maintained by the tour monitor so that these incidents will be included in the tour report. This is time consuming, and because it is done at the end of the tour, accuracy is sacrificed.

Further, prior art guard tour systems required that a user enter a computer program or type in instructions to begin downloading information from the reader. This is often a time consuming process, requiring some computer skills.

The present invention is directed to an improved guard tour system, which includes advanced electronic hardware and software with improved data acquisition and reporting capabilities. The present invention improves efficiency and insures that guard tours are completed accurately and that any security problems are detected quickly.

Therefore, in light of the foregoing deficiencies in the prior art, the applicant's invention is herein presented.

SUMMARY OF THE INVENTION

The guard tour system of the present invention is comprised of a computer running a computer program that enables a variety of electronic hardware components to function as the guard tour system. It is also contemplated that the computer program be multi-user and/or network compatible. The electronic hardware may comprise in one embodiment a positioning system and a data acquisition system, for acquiring information regarding the location, time and other information relating to certain locations or objects along a guard tour. In an alternate embodiment, the system may comprise one or more touch button readers, one or more downloaders for use with the touch button readers and a plurality of touch memory buttons located along a guard tour. Using the positioning system, time-stamped location information can be selectively acquired relating to particular locations or objects along a guard tour. The system may comprise an integrated positioning system, such as a GPS unit or receiver, cell phone locator system, local positioning system or other suitable system, to allow collection of various guard and/or vehicle position information as well as other information. This position information may include, but is not limited to, guard location and time information and guard tour information. The position information may also include vehicle travel and location information. The invention may also selectively use touch memory buttons, wherein each touch memory button includes preprogrammed information specific to its particular location. As a guard or night watchman progresses through the guard tour, the system allows the guard to selectively acquire time-stamped location information relating to particular sites or objects along the tour path. Alternatively, or in conjunction with the positioning system similar information can be obtained using touch memory buttons positioned along the guard tour path. The guard can acquire the location data and/or read the information stored within each touch memory button using a hand-held, battery operated reader. Immediately or at the end of the tour, the guard transfers the stored data to one or more central computers for processing.

The central computer is programmed to acquire tour data and position data from the readers and downloaders, process such data and generate reports summarizing patrol data. Although these are the primary functions of the central computer, other functions may be performed by the computer as will be described herein.

The software of the present invention automatically configures itself to be compatible with a variety of guard tour system hardware from other manufacturers. Therefore a company already using certain guard tour checkpoints and readers can easily use the system of the present invention.

The preferred embodiment of the present invention also includes a number of features designed to facilitate easy use of the system. The computer program provides a hierarchical organization of information to give users easy access. The system also includes a feature that allows users to download data even when the guard tour computer program is not running on the central computer. Further, the present invention provides insert detection, so that when a reader is placed into the downloader system, the data are immediately downloaded without the need for instructions from the user. Additionally, users can customize reports to suit a particular need.

The guard tour system of the present system may also include enhanced security features. Particularly, the present invention solves a deficiency of prior art systems that required a guard to visit each checkpoint in a predetermined sequence and in a prescribed amount of time. The present invention implements a method consisting of rules which allow more flexibility in guard tours.

Although the preferred embodiment of the disclosed guard tour system is directed toward security applications, the system can also be used in a plurality of applications in which it is important that regular checks of various conditions are made and verified. For example, the present invention can be used to insure regular checks of fire extinguishers throughout a facility. In this example each fire extinguisher would be checked and time-stamped position information acquired for each. In an embodiment using touch memory buttons, a touch memory button could be fastened to the exterior of each extinguisher. The position information can be associated with information identifying the particular fire extinguisher in almost an identical manner as used to monitor a guard patrol path. Other applications for the present invention, include but are not limited to, equipment checks, maintenance checks, hotel, restaurant, super market and/or restroom cleaning checks, patient checks in hospitals, and just about any application which requires regular monitoring and accountability.

Based on the foregoing, it is an object of the present invention to provide a guard tour system wherein guards can quickly and easily gather patrol information and transmit such information to a central location.

It is another object of the present invention to provide a hierarchical organization system for security information.

It is another object of the present invention to define rules for analyzing data acquired during a patrol or shift.

It is another object of the present invention to provide location or position information relating to a patrol or the like.

These along with other objects and advantages of the present invention will become more readily apparent from a reading of the detailed description taken in conjunction with the drawings and the claims.

DETAILED DESCRIPTION OF THE PREFERRED EMBODIMENT

Figure 1:
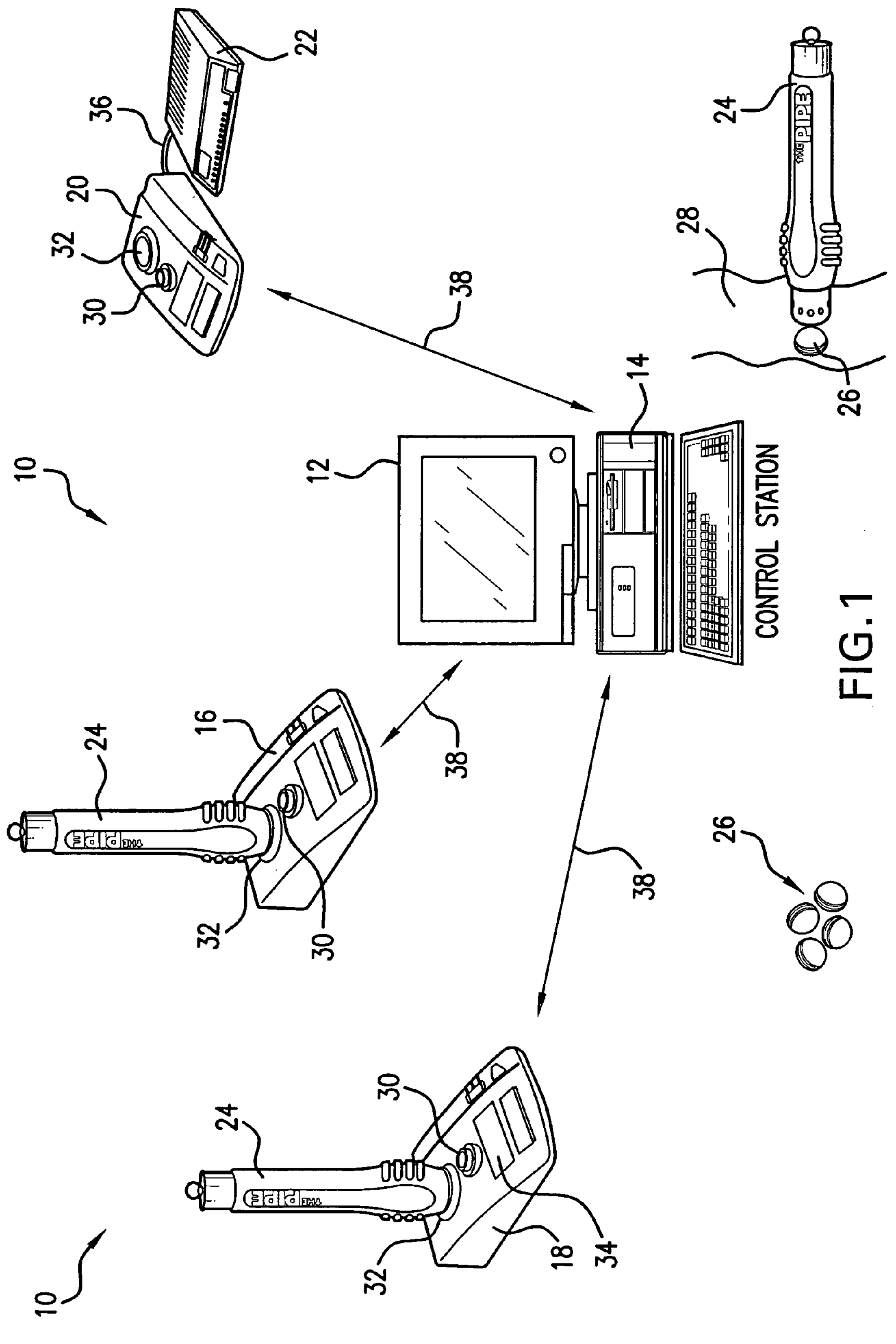
FIG. 1 is a partial schematic illustration of the guard tour system of the present invention comprising a central computer, one or more downloaders, a plurality of touch memory buttons, one or more touch button readers, and a global positioning system receiver.

The present invention is fully described hereinafter with reference to the drawings, in which preferred embodiments of the invention are shown. The invention may also be embodied in many different forms and should not be construed as limited to only the disclosed embodiments. The provided embodiments are included so the disclosure will be thorough, complete and will fully convey the scope of the invention to persons of ordinary skill in the art.

A person of ordinary skill in the art would appreciate that the present invention may be embodied as a method, data processing system, or computer program product. As such, the present invention may take the form of an embodiment comprised entirely of hardware; an embodiment comprised entirely of software or an embodiment combining software and hardware aspects. In addition, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described with reference to flowcharts and/or diagrams that illustrate methods, apparatus or systems and computer program product. It should be understood that each block of the various flowcharts, and combinations of blocks in the flowcharts, can be implemented by computer program instructions. Such computer program instructions can be loaded onto a general-purpose computer, special purpose computer, or other programmable data processing device to produce a machine, such that the instructions that execute on the computer or other programmable data processing apparatus create means for implementing the functions specified in the flowcharts. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowcharts or diagrams.

It will be understood that blocks of the flowcharts support combinations of means for performing the specified functions, combinations of steps for performing the specified functions and program instruction means for performing the specified functions. It is also to be understood that each block of the flowcharts or diagrams, and combinations of blocks in the flowcharts or diagrams, can be implemented by special purpose hardware-based computer systems which perform the specified functions or steps, or combinations of special purpose hardware and computer instructions.

The present invention could be written in a number of computer languages including, but not limited to, C++, Basic, Visual Basic, Fortran, Cobol, Smalltalk, Java, and other conventional programming languages. It is to be understood that various computers and/or processors may be used to carry out the present invention without being limited to those described herein. The central computer 14 is an IBM or IBM-compatible personal computer, preferably utilizing a DOS, Windows 3.1, Windows 95, Windows NT, Windows 2000, Windows XP, Unix, or OS/2 operating system. However, it should be understood that the present invention could be implemented using other computers and/or processors, including, but not limited to, mainframe computers and mini-computers.

Although the following description refers primarily to memory buttons and touch button readers to be used in conjunction with the present invention, it is contemplated that the system can be carried out using other existing modes of marking checkpoints, including but not limited to, touch memory buttons, bar codes, magnetic strips, radio frequency transmitters/transceivers, and ultrasonic transmitters/transceivers.

Turning now to the drawings, FIG. 1 shows a partial schematic illustration of the guard tour system of the present invention. Guard tour system 10 is primarily comprised of a central computer 14 and a monitor 12 that communicates with one or more types of data downloading devices. The most basic data downloading device is direct downloader 16 connected to central computer 14 through standard communications means 38, such as an RS-232 cable. Direct downloader 16 may comprise a positioning system in an embodiment, such as a GPS receiver, cell phone locator system, local positioning system or the like, Using the positioning system, time-stamped position information can be acquired for predetermined locations, such as for doors, warehouse or the like, or objects, such as fire extinguishers or the like. The location information may be selectively acquired on demand by a guard or the like, or automatically at intervals or the like. Downloader 16 may also comprise a touch memory button port 30 and reader port 32. A hand-held data acquisition device 24 may be carried by a guard or the like. The data acquisition device 24 may then be used to acquire time-stamped location data relating to a guard tour or the like, instead of or in combination with using touch memory buttons or the like.

By inserting the reader 24 within reader port 32 of direct downloader 16, central computer 14 can read guard tour information or patrol data from the reader 24. Direct downloader 16 connects directly via a cable to the serial communications port of the central computer 14, or can otherwise be suitably connected. After the patrol data has been downloaded to central computer 14 the patrol data are erased or cleared from the reader 24.

Other types of data downloading devices also include mobile downloader 18 and modem downloader 20. Each of these downloaders may also have a positioning system or could include touch button memory ports 30 and reader ports 32. In an embodiment, the mobile downloader 18 comprises an integrated positioning system, such as a GPS receiver, for collection of location information. Mobile downloader 18 with integrated positioning system may be mounted in a guard's vehicle allowing for collection of vehicle position information. Based upon the small size of the mobile downloader 18, it can be covertly installed in a vehicle, while performing the functions of acquiring, time stamping and storing position information. When mounted in a vehicle, the unit may operate from the vehicle battery or other suitable power source, and may be used to determine and record vehicle speed or other vehicle operation characteristics, which also could be captured and recorded and/or transmitted. Vehicle path information may be calculated from such gathered vehicle position information. Mobile downloader 18 may be directly connected to the serial communications port (not shown) of the central computer 14, or otherwise be suitably connected. Mobile downloader optionally may be directly connected to a USB port of the central computer or any other suitable external peripheral interface. By inserting the reader 24 into the reader port 32 the central computer 14 is able to download information from the reader. When not connected to the central computer 14 by means of an RS-232 cable, USB cable, cellular, or other wired or wireless connection, the mobile downloader 18 can store reader data, position data, and other data internally until it is possible to transmit the stored data to the central computer. Modem downloader 20 connects to the central computer 14 over the telephone lines via a modem. Data are transferred bi-directionally between the downloaders (16, 18 and 20) and the guard tour software via a plurality of communications means 38, including but not limited to direct line, infrared, radio frequency, telephone lines, cellular telephones, over the Internet, satellite transmission or any other method of transmitting information.

Figure 2:
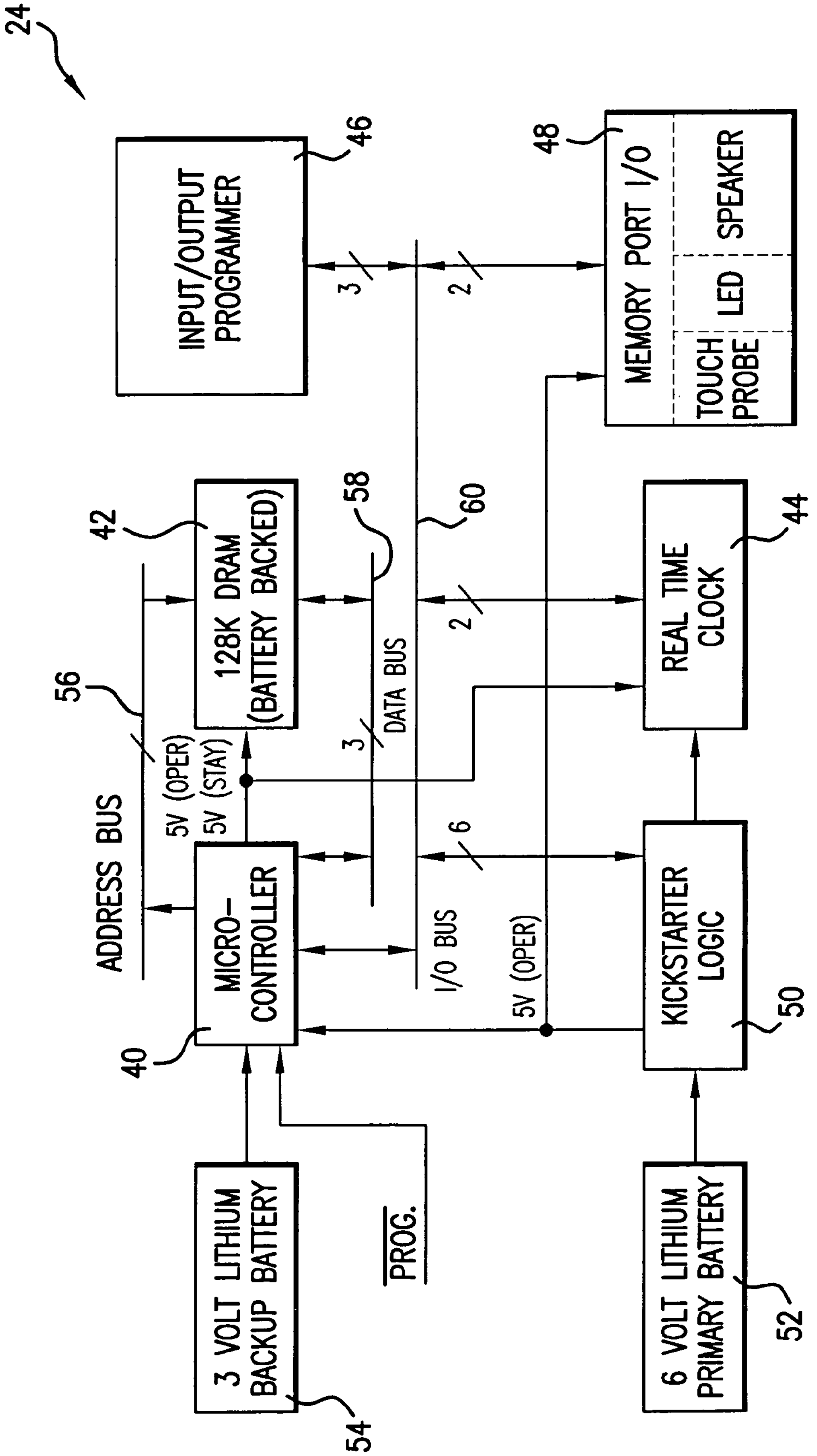
FIG. 2 is an electronic block diagram of a touch button reader of the present invention.

FIG. 2 shows the functional blocks that make up an embodiment of reader 24 of the present invention. Reader 24 is comprised of microcontroller 40, nonvolatile memory 42, kickstart logic 50 and real time clock 44. Primary battery 52 provides main power to the touch button reader 24. Backup battery 54 provides power to memory 42, thereby making it quasi-nonvolatile, to maintain the patrol data acquired from the positioning system 61 and/or touch memory buttons 26 and the kernel software for the reader 24 during replacement of primary battery 52. In an embodiment wherein reader 24 has a positioning system 61, the user may acquire time-stamped location data on demand, such as by means of an actuator or the like. The positioning system 61 may be a GPS unit or receiver or other positioning system for collection of location information. Exemplary GPS receivers for such a purpose are known, and any suitable positioning system to provide location and associated information is contemplated by the invention. Alternatively, other suitable systems to produce location information could be used such as locating systems associated with cell phones or other wireless communication systems. As an example, the positioning system may be provided by including support for the E911 cell phone standard or for other local positioning systems. With cell phone communication networks determination of the E911 standard allows accurate location of cell phone transmissions, which could be used if data is transmitted by a cellular link. Alternatively, the device could transmit data via a cellular link when a "panic button" is actuated, thereby allowing position information relative to the device to be recorded and responded to. Other positioning systems 61 are also known for use in local environments, such as positioning systems for tracking patients or other personnel in a hospital or other local environment. Any suitable positioning system 61 is contemplated for use in the present invention.

In the embodiment of the present invention wherein the reader 24 includes an integrated positioning system, the guard carries the reader 24 with an integrated positioning system, and guard position information may be gathered as the guard makes rounds. In this manner, the guards location information can be monitored at all times along with guard tour information. Additionally, when the guard is driving as part of a guard tour, the position of the vehicle can be monitored. As an example of operation, the system could be configured to record the position of the reader 24 when disconnected from a downloader, at periodic times, on demand, or continuously. Thus, if vehicle travel occurs, location information relating to vehicle travel can be acquired. Along with position information, time can also be logged. Guard tour information may also be calculated from such gathered guard position information. Data can be stored in nonvolatile memory 42, such as the location coordinates along with time and date information, such as from real time clock 44.

For use with touch memory buttons 26, the tip of the reader 24 may include a touch button contact, electrically connected to I/O port 48, which is placed in contact with a touch memory button 26 mounted on a wall 28 or other surface. Touch memory button 26 receives power from the touch button contact on reader 24. Data from touch memory button 26 is then stored in nonvolatile memory 42, along with the time and date of the read provided by real time clock 44. In one embodiment, reader 24 can store up to 4,880 data reads before the data must be downloaded (optional) and the reader cleared. The reader can be programmed to alter its behavior via the programmer I/O 46 (input/output). The operation of reader 24 is controlled by a microcontroller 40 which communicates with other internal components via data bus 58, address bus 56, and I/O bus 60. The data in a reader 24 in any embodiment may be transferred to the guard tour computer program through the downloaders 16, 18, and 20 shown in FIG. 1. The data transfer or downloading is initiated by placing the reader 24 into the reader port 32 of one of the downloaders.

Figure 4:
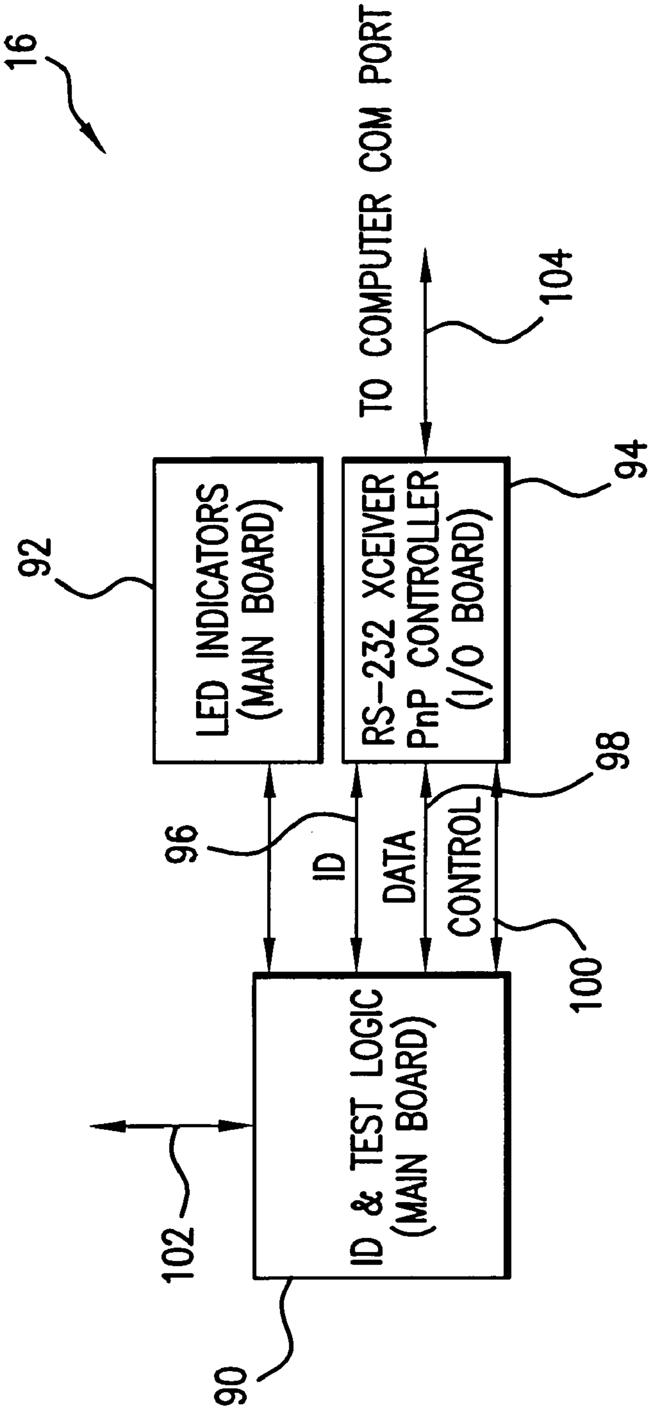
FIG. 4 is an electronic block diagram of a direct downloader of the present invention.

FIG. 4 shows the functional blocks that make up direct downloader 16 of the present invention. Direct downloader 16 may also include I/O board 94 and communications port 104 which handle communication between the communications port (not shown) of central computer 14 and control plug-and-play dynamic hardware identification. Direct downloader 16 also includes indicators 92 and test logic 90. The ID and test logic 90 is connected to I/O board 94 by ID bus 96, data bus 98 and control bus 100. Indicators 92 display the status of data transfer and power supplied to the downloader 16. When reader 24 is placed in reader port 32 (reference numeral 102 of FIG. 4) test logic 90 provides pass/fail indication for the primary battery 52 for reader 24.

The Windows 95 and later operating system marketed by the Microsoft Corporation includes the plug-and-play dynamic hardware identification feature which will detect the presence of the downloader 16, and then proceed to install the downloader. The plug-and-play capability of the Direct Downloader 16 solves a common problem with computer communication port devices because it is not necessary to assign interrupts, resolve IRQ conflicts, or determine communication port assignments with devices that meet plug-and-play standards. It is also contemplated that mobile downloader 18 and modem downloader 20 can also incorporate the same plug-and-play dynamic hardware identification feature.

In an embodiment using touch memory buttons, Direct Downloader 16 having plug-and-play compatibility may also be used to enter ID numbers from each touch memory button 26 into the database of the guard tour computer program of the present invention. Reading and associating locations with ID numbers from the touch memory buttons 26 is typically done during initial setup of the guard tour computer program. When a touch memory button 26 is placed on the touch memory button port 30 (reference numeral 102 in FIG. 4), the guard tour computer program running on central computer 14 records the ID number of the button 26. The user then uses the keyboard (not shown) to enter a description of that button 26 into the guard tour computer program database running on central computer 14. The user must choose a "type" for each touch memory button 26 such as Officer, Incident, and Location. While one preferred embodiment uses touch memory buttons 26 that are permanently preprogrammed with an identification number, basically making them read-only memory, the present invention could also use reprogrammable touch memory buttons. This option would allow various types of information to be included within the touch memory button making them more versatile. A person of ordinary skill in the art understands the interchangeability of read-only and reprogrammable memory devices.

"Officer" buttons can be defined with the patrolman or officer's name, an identification number or any other means of identifying a specific officer. The officer will typically carry this button when making patrols. "Incident" buttons can be defined with descriptions of typical problems found while making patrols. Examples of typical problems include but are not limited to "window broken", "door unlocked", "tampering" and other problems noted during patrols. Incident buttons can be customized depending on the characteristics of the area being patrolled. Incident buttons are carried with patrol officers, often in a wallet designed for that purpose. Users can create incident buttons with duplicate descriptions so that they may be carried by several patrol officers at a given time. "Location" buttons are defined with the names or descriptions of the locations to be patrolled. These buttons are installed, usually on a wall 28 or other hard surface near each location.

It should also be recognized that in an embodiment using a positioning system, similar ID information can be associated with predetermined locations or objects. Position information may be acquired and stored using a suitable positioning system, such as a GPS receiver or other positioning system as previously described. Positioning information acquired from a positioning system may take the place of and negate the need for some or all Location buttons when the positioning information alone is accurate enough to determine whether patrols are being correctly performed. Position information may also be correlated along with information gathered by means of the touch memory buttons 26, thereby allowing a location-based tour to be constructed. The guard tour system 10 of the present invention contemplates that users can identify locations or touch memory buttons 26 with any information necessary to identify an aspect of a guard tour or patrol.

Figure 3:
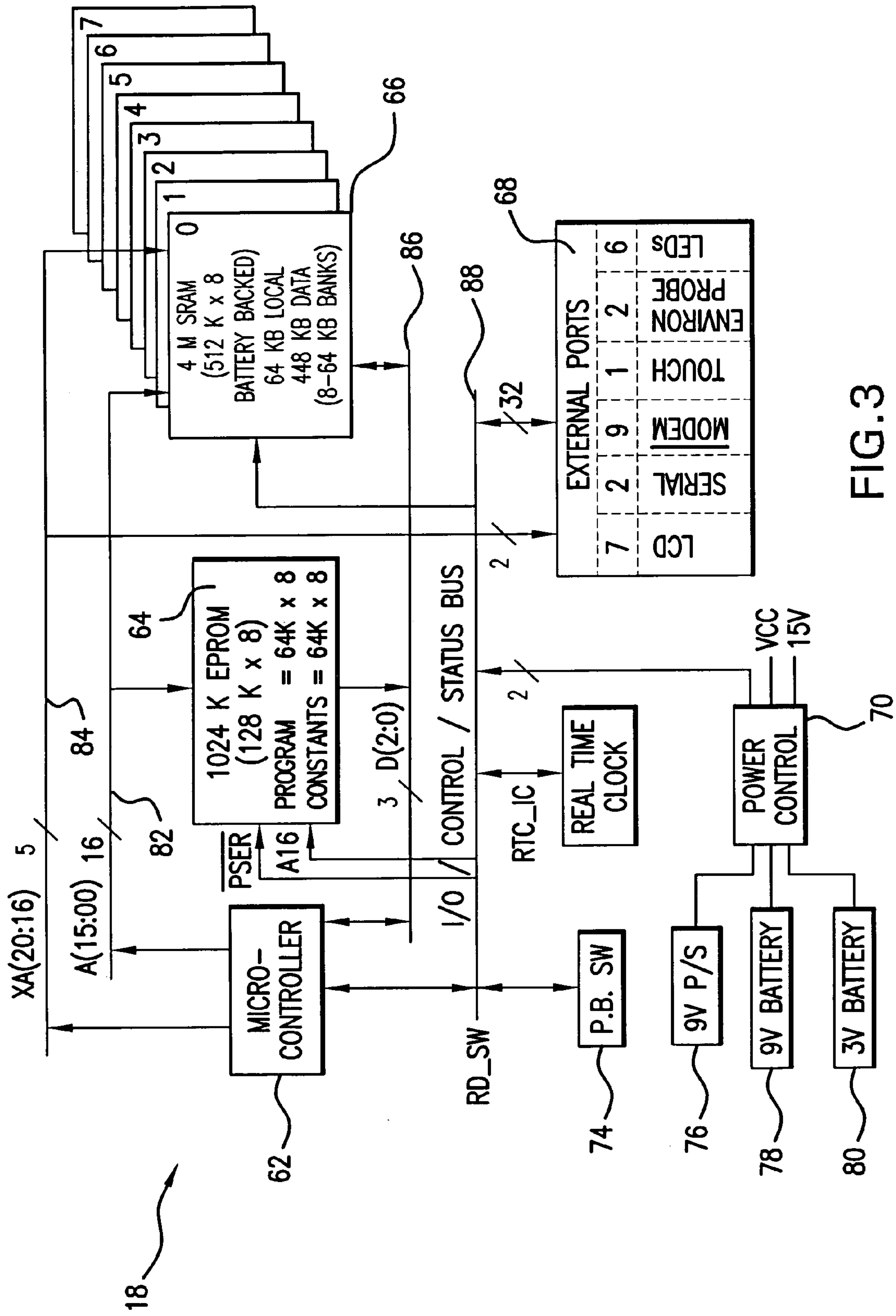
FIG. 3 is an electronic block diagram of an intelligent downloader of the present invention.

Mobile Downloader 18 and Modem Downloader 20 of the present invention are shown in FIG. 1. These devices are known generically as intelligent downloaders. A block diagram of the circuitry that makes up intelligent downloader 18 is shown in FIG. 3. Intelligent downloader 18 (also referred to as Mobile Downloader 18) includes and uses a microcontroller 62 to control all of its functions via data bus 86, address bus 82, I/O/control/status bus 88 and extended address bus 84. Microcontroller 62 receives its operating instructions from a computer program stored in EPROM 64 (electrically programmable read only memory). Microcontroller 62 electronically communicates with EPROM 64 through data bus 58 and address bus 56.

Intelligent downloader 18 includes memory 66 to store guard tour data from the reader 24. In an embodiment, memory 66 is comprised of a bank of SRAM (static random access memory) or Flash memory which is provided back up power (or made quasi-nonvolatile) by 3 volt battery 80. Memory 66 is preferably of sufficient size to store 7,000 or more data records. While data records are maintained in memory 66 if main power to intelligent downloader 18 is lost, for normal operation an external 9 volt power supply 76 is required. A 9 volt battery 78 may be used, wherein the 9 volt power supply 76, 9 volt battery 78 and a 3 volt back-up battery 80 are connected to power control 70 which is connected to I/O/control/status bus 88. In an embodiment, the downloader 18 or 20 may further comprise a positioning system 81, as an alternative or in addition to providing positioning system 61 with reader 24.

Intelligent downloaders 18 may also include a display 34 such as an LCD (liquid crystal display). Display 34 is electrically connected to external port 68 by I/O/control/status bus 88 and extended address bus 84. The display 34 allows users to view the current date and time (provided by the real time clock 72), the memory 66 and data download status, and a variety of diagnostic information. When intelligent downloader 18 is configured as a Modem Downloader, display 34 provides a menu from which the user can select the type of modem connected to external port 68. There are also several LEDs (light emitting diodes) connected to external port 68 used to indicate the status of system power, memory, data transfer, and the modem (Modem Downloader 20 only). Intelligent downloader 18 is configured during the manufacturing process as either a Mobile Downloader 18 or a Modem downloader 20.

The Mobile Downloader 18 is intended to be used in a car or truck and powered from the cigarette lighter or accessory outlet in the vehicle. Typically the Mobile Downloader 18 is taken from site to site that will be guarded. Reader 24 used at each site is then placed in the reader port 32 of Mobile Downloader 18 and the patrol data from the reader 24 are downloaded into memory 66, shown in FIG. 3. After patrol data are downloaded, the reader 24 is cleared and its real time clock 44 is reset making the reader 24 ready to be immediately returned to service. When all readers 24 have been downloaded into the Mobile Downloader 18, it is removed from the vehicle and taken to the central computer 14 on which the guard tour computer program is being run. The backup battery 80 maintains the patrol data in memory 66 of Mobile Downloader 18 until the downloader 18 can be connected to its normal office power supply 76. Once the Mobile Downloader 18 returns to the user's central office it is connected to the communication port (not shown) of central computer 14 and the patrol data stored in memory 66 is then transferred to the guard tour computer program database. Once this download is complete, memory 66 of Mobile Downloader 18 is cleared and its real time clock 72 is reset to match the internal clock (not shown) of central computer 14.

The Modem Downloader 20 can be used in the same manner as Mobile Downloader 18, except that Modem Downloader 20 has the additional capability of transferring patrol data from its memory 66 to central computer 14 via modem 22 (shown in FIG. 1). Modem 22 allows remote site locations to transfer patrol data to central computer 14 located at a central office. In this configuration central computer 14 acts as a host computer. The initiation of the transfer of patrol data can be from the Modem Downloader 20 or the host computer (central computer 14). An RS-232 communication cable 36 is used to connect the modem 22 to the Modem Downloader 20. Alternatively, wireless communication may allow downloading from a remote site. When the reader 24 is placed in touch button reader port 32 the patrol data from the reader 24 is downloaded into memory 66. Next the reader 24 is cleared and its real time clock 44 is reset making reader 24 ready to be returned to service. When all readers 24 have been downloaded into the Modem Downloader 20, either the Modem Downloader 20 can dial the host computer (central computer 14), or the host computer can dial Modem Downloader 20.

For the Modem Downloader 20 to initiate the call to the host computer the following protocol is used. The user designates specific data from the positioning system 61 and/or touch memory buttons 26 as "command data" using the guard tour computer program. In addition, specific readers 24 are designated as "command readers". The guard tour computer program stores command data and reader 24 information, along with the telephone number for the host computer, the local time zone, and other information in memory 66 of Modem Downloader 20. When command data is provided to the port 30 of downloader 20, or a command reader 24 is placed in the reader port 32 of downloader 20, the Modem Downloader 20 will dial the stored telephone number. When the modem (not shown) in the host computer answers, the guard tour computer program will download the patrol data from the Modem Downloader 20, clear its memory 66, and reset its real time clock 72. The telephone line modem connection is then automatically disconnected. For the host computer to call the Modem Downloader 20 a different procedure is used. The user specifies the locations, telephone numbers, time zones, and other information for each remote patrol site. When desired, the user can then use the guard tour computer program to initiate a call to the remote patrol site. When the connection is established, the data transfer continues as previously described.

Figure 5:
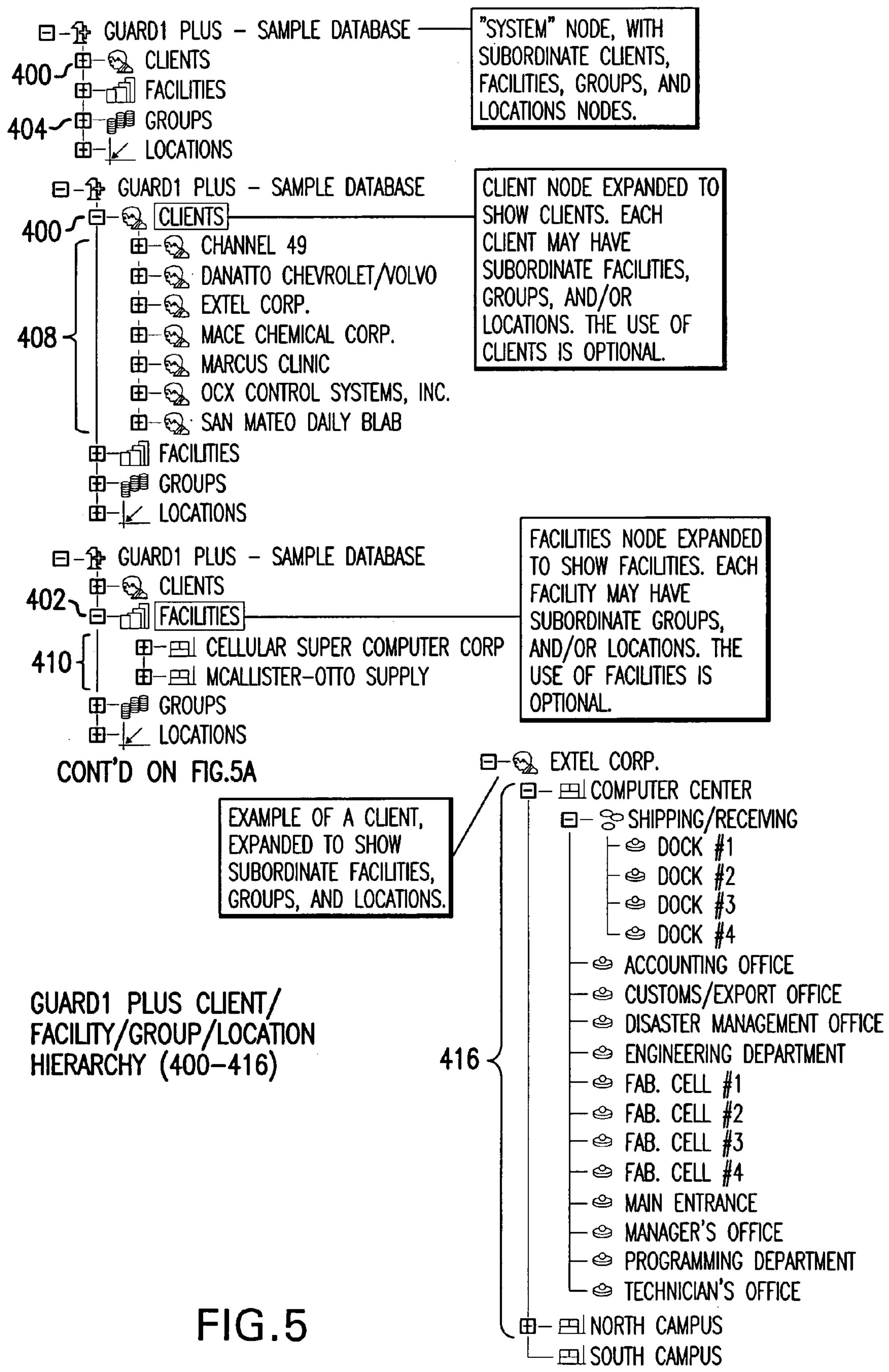
FIG. 5 is a chart showing the hierarchy used to group and display information in the present invention.
Figure 5A:
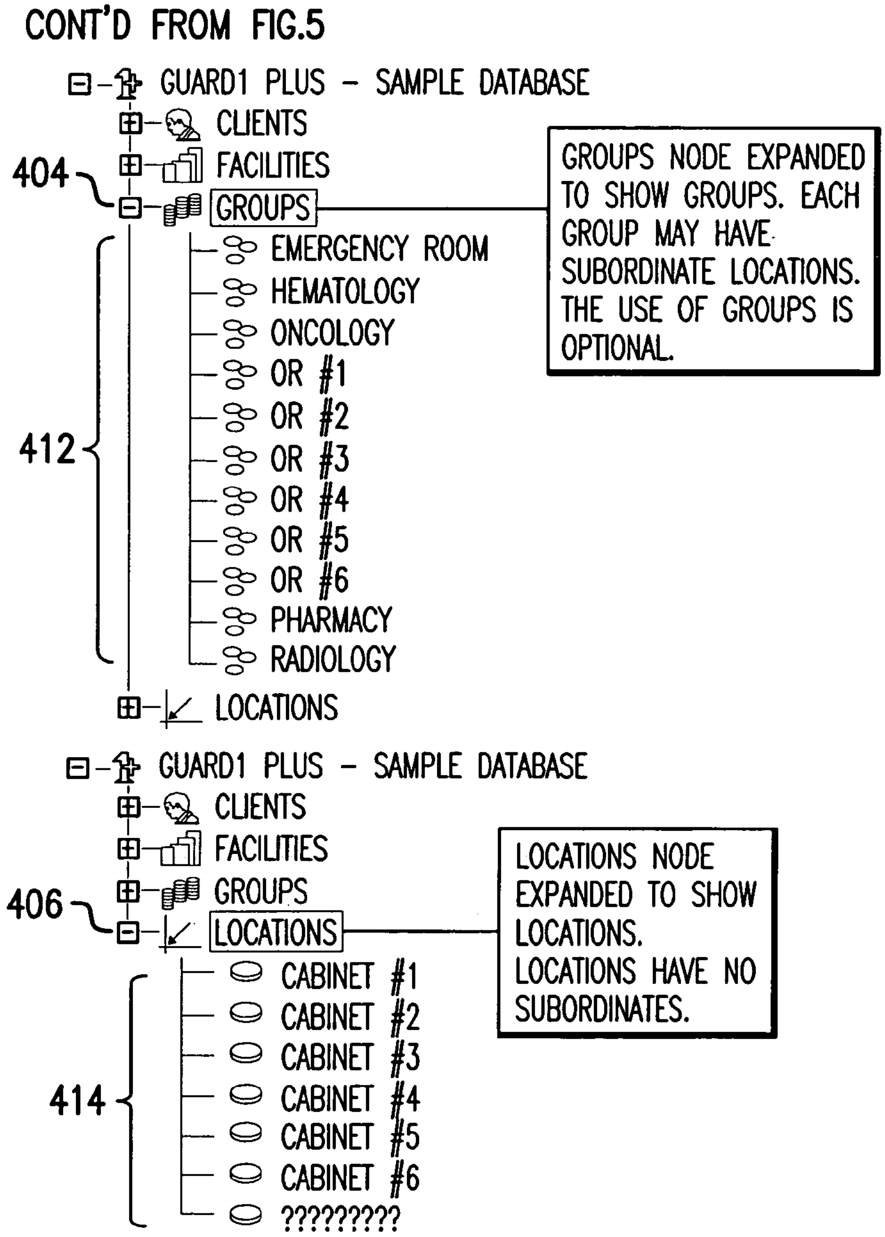

FIG. 5 shows the hierarchical organization of information in an embodiment of the present invention. Information can be grouped into categories or "nodes" including but not limited to Clients 400, Facilities 402, Groups 404, and Locations 406. Client nodes can have subordinate facilities 410, groups 412 and/or locations nodes 414. Facilities 402 can have subordinate groups 412 and locations nodes 414, and groups 404 can have subordinate locations nodes 414. An example of a client 400, having facilities 402 groups 404 and locations 406 is shown at 416. This organization is advantageous to the user because he or she can quickly access information on a single screen without searching through various menus or on-screen forms.

In use, the categories can be used to divide information into an easily accessible hierarchy of nodes. For example, the Clients category may be used by security companies who supply services to a variety of different organizations to keep lists of clients 408 and the relevant information about each client in a central location. If a particular client has several facilities requiring patrolling, each of those can be listed in a separate facilities node under the client's node. In addition, if there are multiple locations in a particular facility or area that need to be checked as part of the patrol tour, these can also be listed subordinate to the client's node. Further, in-house security departments may use the groups 404 or locations 406 categories to organize patrolling for their own business.

For instance, the user may list rooms or floors as groups and then certain rooms or offices as locations. Use of each category is optional and is not necessary to the function of the system. The above list is merely exemplary and is not an exhaustive list of all uses of the hierarchical categories of the present computer program.

Figure 6:
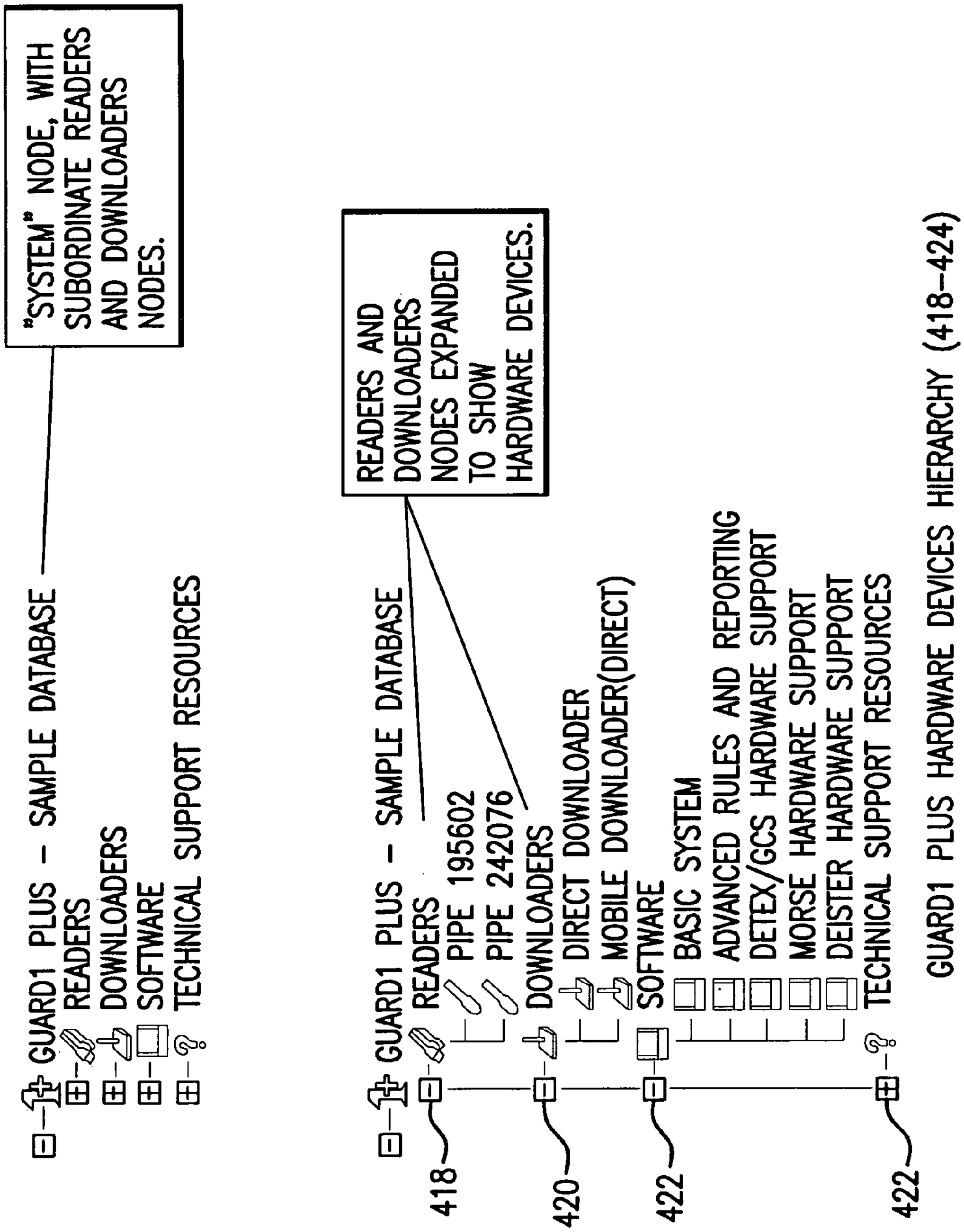
FIG. 6 is a chart summarizing the hardware devices hierarchy in the present invention.

FIG. 6 shows the hierarchical organization of the hardware devices used with the present invention. The hardware devices including readers 418, downloaders 420, software 422, and technical support resources 424 are organized in a hierarchical node system. Users list under each node the specific identity of each hardware component in the system. In the Readers node 418, the user identifies all of the readers by number or name to show all of the readers in the system or in use at a particular time. Under the Downloaders node, the user could specify all of the downloaders in the system and their locations. Under the Software node, the user may view all software modules available and determine which are presently activated. Finally, the Technical Support Resources node indicates how to contact the supplier for technical support, and can produce a report that may be helpful for technical support incidents.

The hierarchical arrangement of the present invention improves on previous systems in that it gives access to all readers and downloaders through one click of a mouse button. This simplifies adding, deleting, renaming and downloading all hardware used for patrols.

Figure 7:
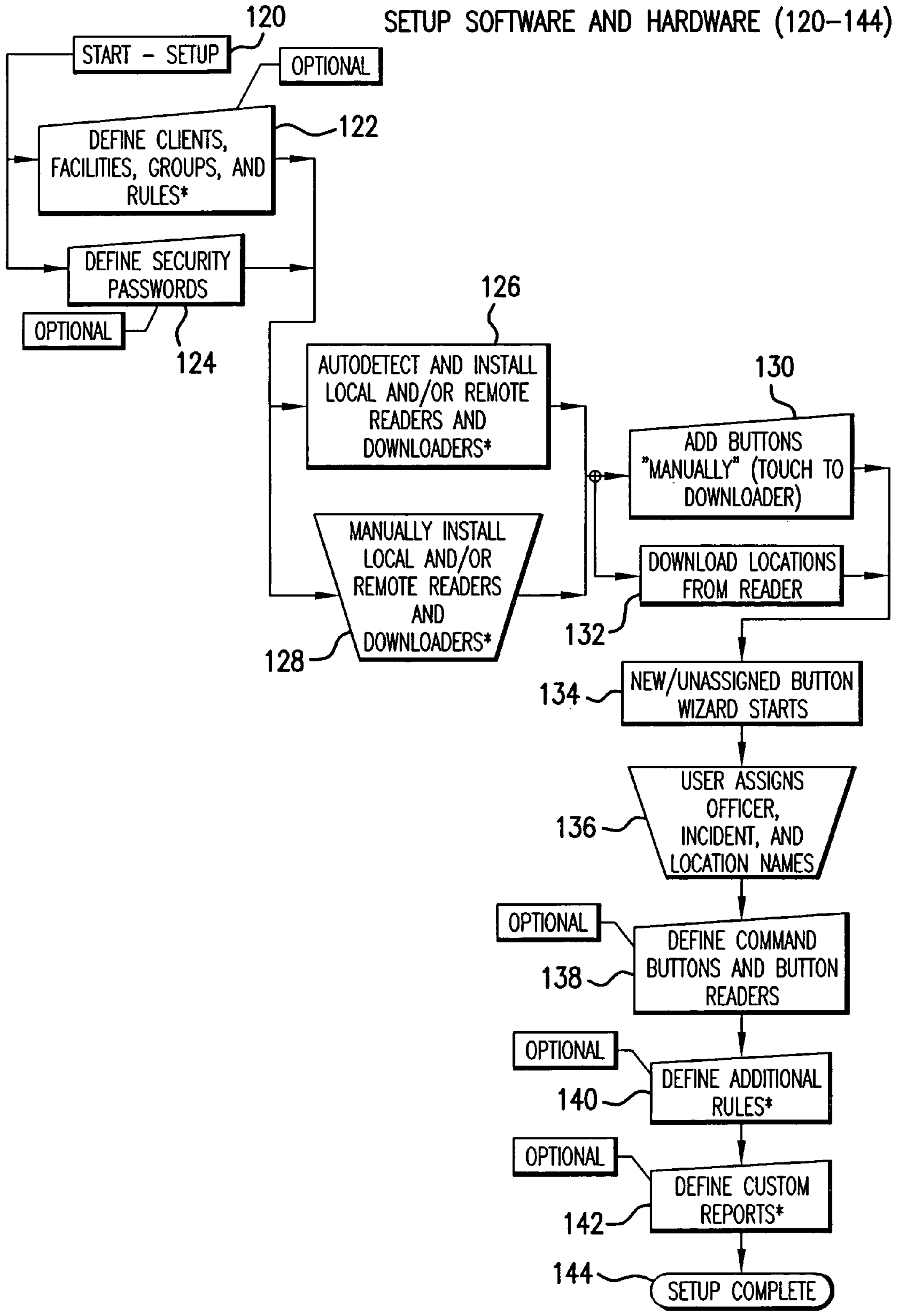
FIG. 7 is a flowchart illustrating the process of setting up the computer program and electronic hardware of the present invention.
Figure 15:
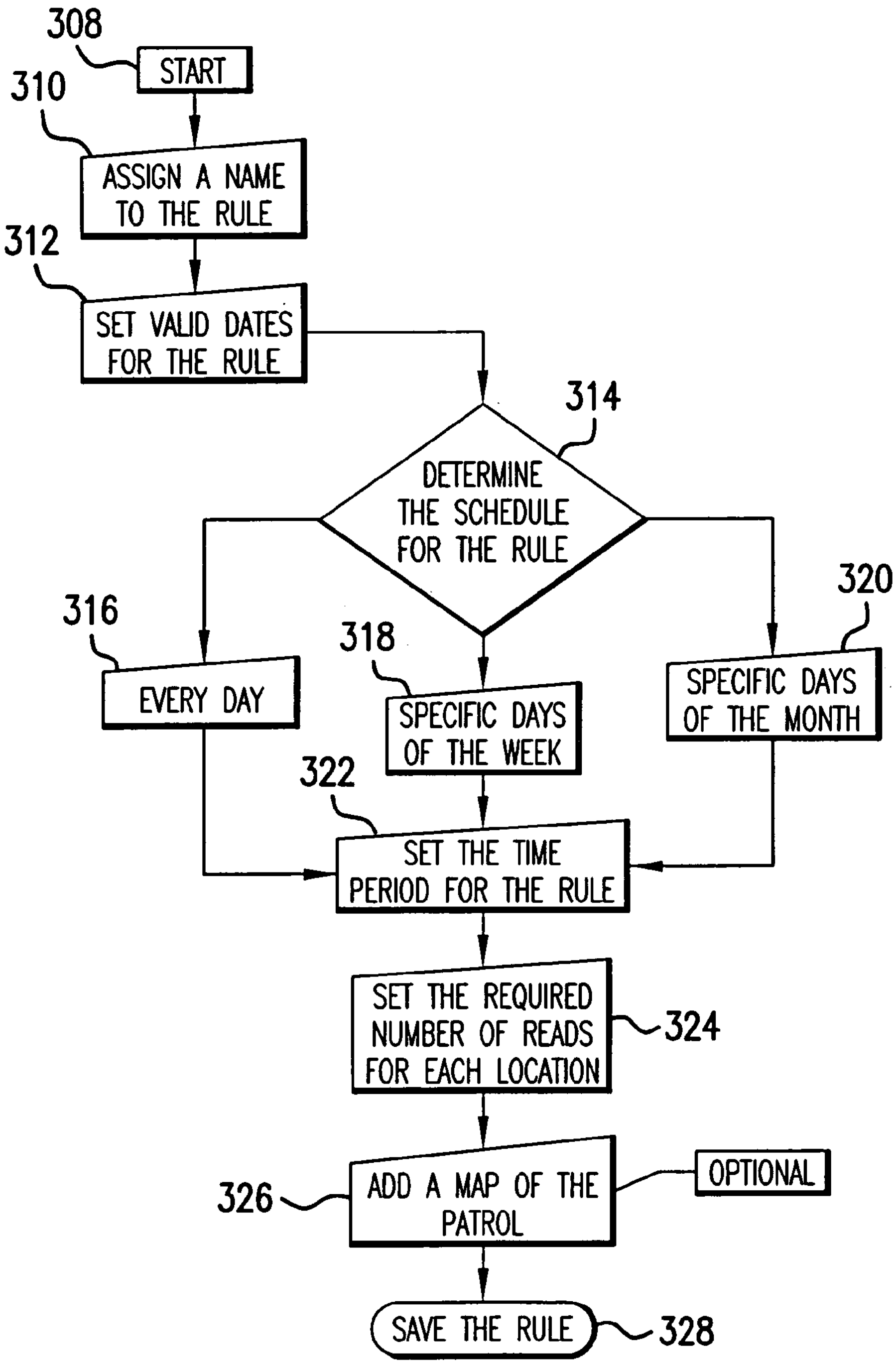
FIG. 15 is a flow diagram showing the process of creating and defining rules in the present invention.

FIG. 7 illustrates the process of setting up the guard tour computer program and hardware. In one preferred embodiment of the invention, Setup is primarily used to define locations and/or objects using positioning information, memory buttons or other "checkpoints" that describe and identify officers, incidents, and locations. In an embodiment having a positioning system as part the system, the frequency of position sampling by means of a GPS receiver or other suitable positioning system may be set, or a "sample now" button may be enabled or disabled for use with the reader. Some steps in the set up process are optional; the need for the various steps is determined by the type of organization using the computer program and its business or other requirements. At the start of the Setup 120 process the user has the option of defining patrol detail records that include but are not limited to clients, facilities, groups and/or locations 122. These are defined as shown in FIG. 5 and as described above. The user also has the option of defining rules 122. The process of defining rules is shown in FIG. 15 and described below.

An alternate or contemporaneous first step in the Setup 120 process is to define security passwords 124. If security is enabled on the guard tour system or application, it will request a password when the computer program starts. The application will not run if the proper password is not entered. A supervisor can assign passwords to individuals or to groups of employees. Particular passwords can be configured to provide certain levels of access. For example, some employees may have full access, where the user has complete access to all guard tour information, while others have report-only access, where the user can only print or preview reports. Some users may have read-only access, where the user may view the report data but may not make any changes to data. It is contemplated by the present invention that users can define the access that particular individuals can have to patrol data according to the user's needs. Because passwords allow only certain individuals to have full access to the security reports, the chances of data tampering are minimized.

Figure 10:
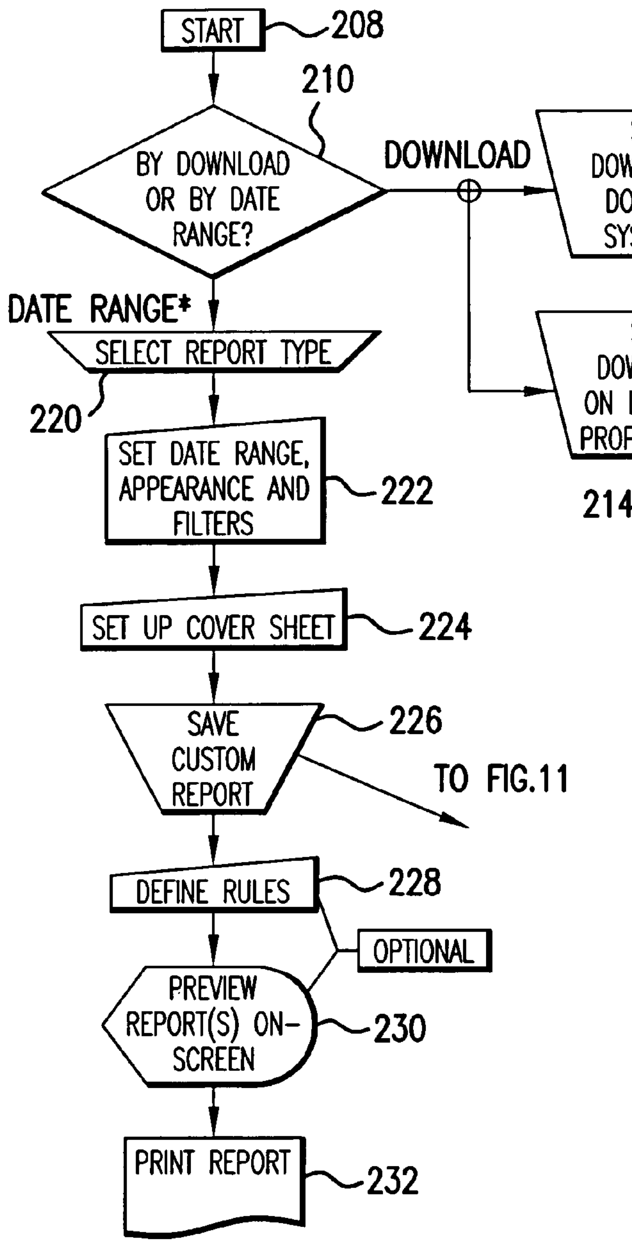
FIG. 10 is a flowchart illustrating the process of generating and printing reports using the present invention.
Figure 10:
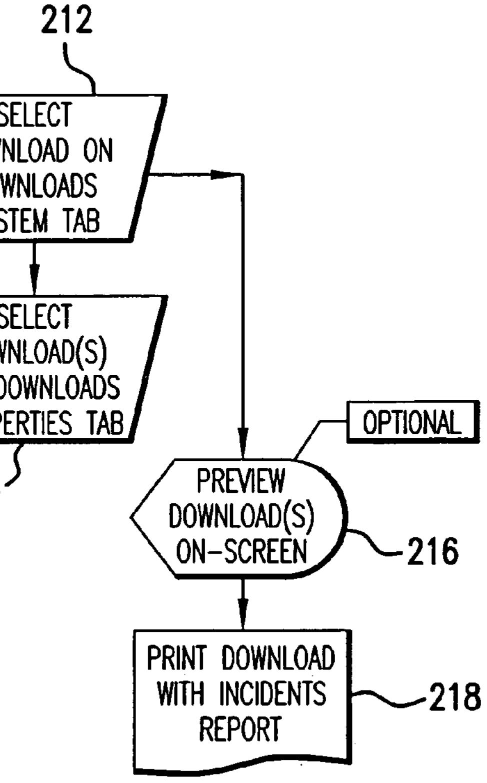

The next step in the setup process is to install the necessary hardware. The software on a central computer can auto detect and install local and/or remote readers and downloaders 126 or manually install local and/or remote readers and downloaders 128. A software "wizard" for adding devices can be used to assist with this process as shown in FIG. 10 and described below. Wizards are small computer programs or software routines that assist users in performing small tasks such as installing new hardware. After the appropriate hardware is installed, the user can add locations and/or memory buttons to the system manually 130, by inputting of locations or touching buttons to the touch memory button port 30 of a downloader 16, at which point the computer program will detect the button 26. It is also contemplated that these could features be incorporated within Mobile Downloader 18 and Modem Downloader 20. Then a software wizard assists with the process of identifying new or unassigned locations and/or memory buttons 134. Next, the user defines the location, object and/or memory button by assigning a description such as location name, officer name, description of an incident or any other characteristic necessary for a particular patrol 136.

Alternatively, information can be collected and downloaded from the reader used in the system 132. For example, using a positioning system, such as a GPS system, location coordinates can be time stamped and saved in a suitable memory. The time stamped location coordinates can relate to predetermined locations to be inspected, such as the front door, warehouse, etc., or to objects such as a fire extinguisher or the like. Further, in locations where GPS data is less accurate or cannot be obtained, touch memory buttons 26 or other types of checkpoint devices can be placed in the field and, a compatible reader can be taken into the field to read those checkpoint devices. The reader can then be placed into the touch memory reader port 32 of a downloader. The reader will be detected and the information downloaded and installed into the guard tour computer program database. After downloading, the guard tour computer program will install the defined time stamped position information, memory buttons or checkpoints into the system. If an undefined position, memory button or checkpoint is found, the software wizard will assist the user in defining this position memory button or checkpoint as described above. The user repeats steps 130–136 until all positions, touch memory buttons or checkpoints are defined. Position information may also be downloaded and may be used to show the guard tour path in conjunction with a map interface as an example. In addition, using time stamped position information, a vehicles speed could be determined. Some position coordinates contained in the position information may be defined as tour locations which must be visited on subsequent patrols, thus eliminating the need for some or all hardware checkpoints or memory buttons.

Next, the user has the option of defining command locations, buttons and readers 138. These are specific locations, buttons or readers identified so as to initiate a call to the host computer 14 when the guard is at the location or touches the memory button 26 or the reader port 32 of the modem downloader 20. The user also has the option of defining additional rules 140 as described below. Further, the user may define custom reports 142. The present invention provides the option of creating a variety of report types which can be customized for a particular user. Customizable options include adding the client's contact information, setting the date range, filtering by specific locations, officers, incidents or any other user defined characteristic. Reports may also be customized with the user or client specific designs, such as logos or watermarks. This is done by creating custom bitmaps in any appropriate application, then placing these bitmaps in the correct directory on the user's hard drive. It is also possible to include drawings or photographs of patrol stops or other visual information to include in the reports.

Once the user has completed the essential steps and has selected optional steps, the setup is complete 144. However, the user has the option to add, delete or change this information at any time.

Figure 8:
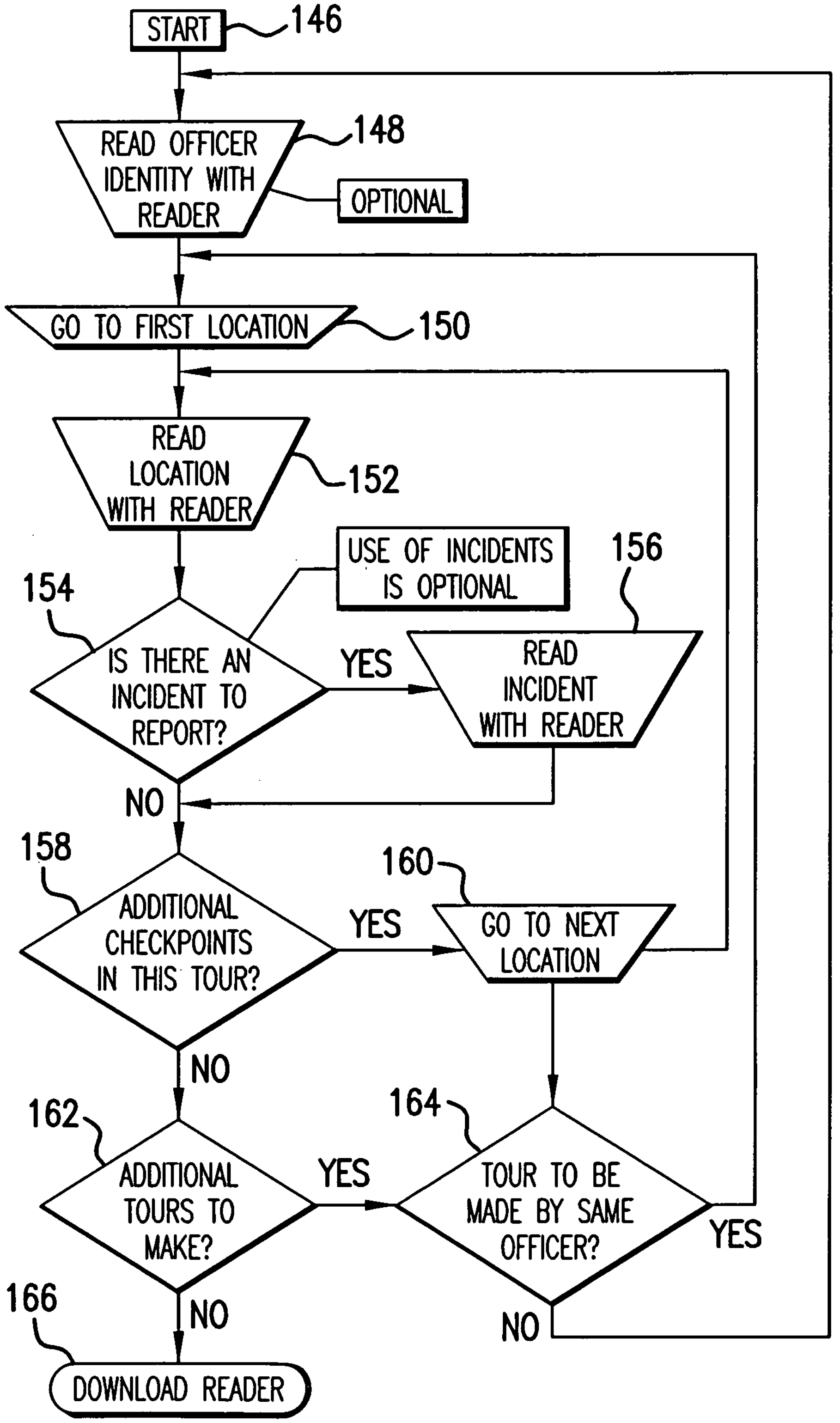
FIG. 8 is a flowchart showing the progress of a guard tour using the present invention.

FIG. 8 illustrates making a typical patrol with a location reader 24. This process is independent of the computer program, and any type of reader compatible with acquiring data relating to predetermined locations in the field may be used. The officer or guard may start a patrol 146 by inputting identifying information or reading his officer button with a touch button reader associated with the reader 24 to be used on the tour 148. Although this step is optional, doing so allows reports to be generated according to the officer. This officer makes a patrol of locations 150, by acquiring time stamped position information, and/or reading the location memory button 26 or other checkpoint device with the reader 24 at each location 152. Steps 150 and 152 are repeated at each location on the patrol. In addition, the officer will look for any incidents along the patrol route 154. The officer may input incident report information or carry incident report buttons with him. If there are incidents to report, the officer will acquire time stamped position information using a system 61 or 81, along with inputting incident information or touch the appropriately defined incident report button 156, with reader 24, to report such an incident. If there are no incidents to report, but there are additional checkpoints on the patrol 158, the officer proceeds to the next location 160 and repeats steps 150 and 152. As the system can record the position of the reader 24, either on a patrol, or when the reader is placed in a vehicle, positional information can be recorded, either continually, on demand, or periodically, and the information downloaded and analyzed. This analysis may use a set of predetermined rules as will be described in more detail with reference to FIG. 15. If there is another patrol to be made 162 by the same officer 164, the officer will go back to step 150. If the next patrol is to be made by another officer, the reader 24 can be passed to the next officer to make the patrol. The next officer inputs ID information or reads his officer button 148 to begin the next patrol. If there are no additional patrols to be made the information can be downloaded 166 from the reader 24. Information does not have to be downloaded from readers 24 at specified time periods such as at the end of every patrol or shift. The reader 24 is capable of storing the information for days or weeks if necessary.

Figure 9:
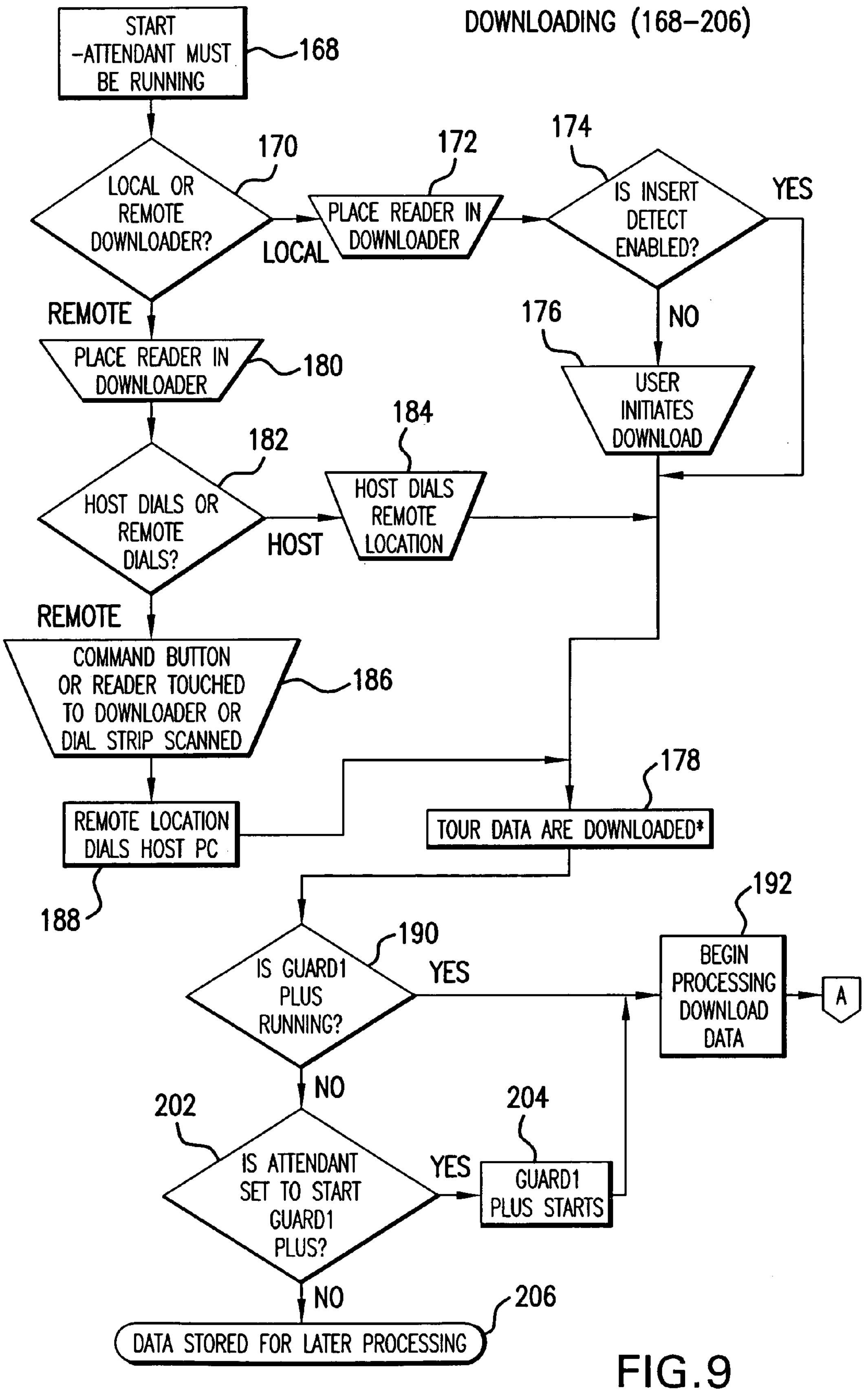
FIG. 9 is a flowchart of the downloading process in the present invention.
Figure 9A:
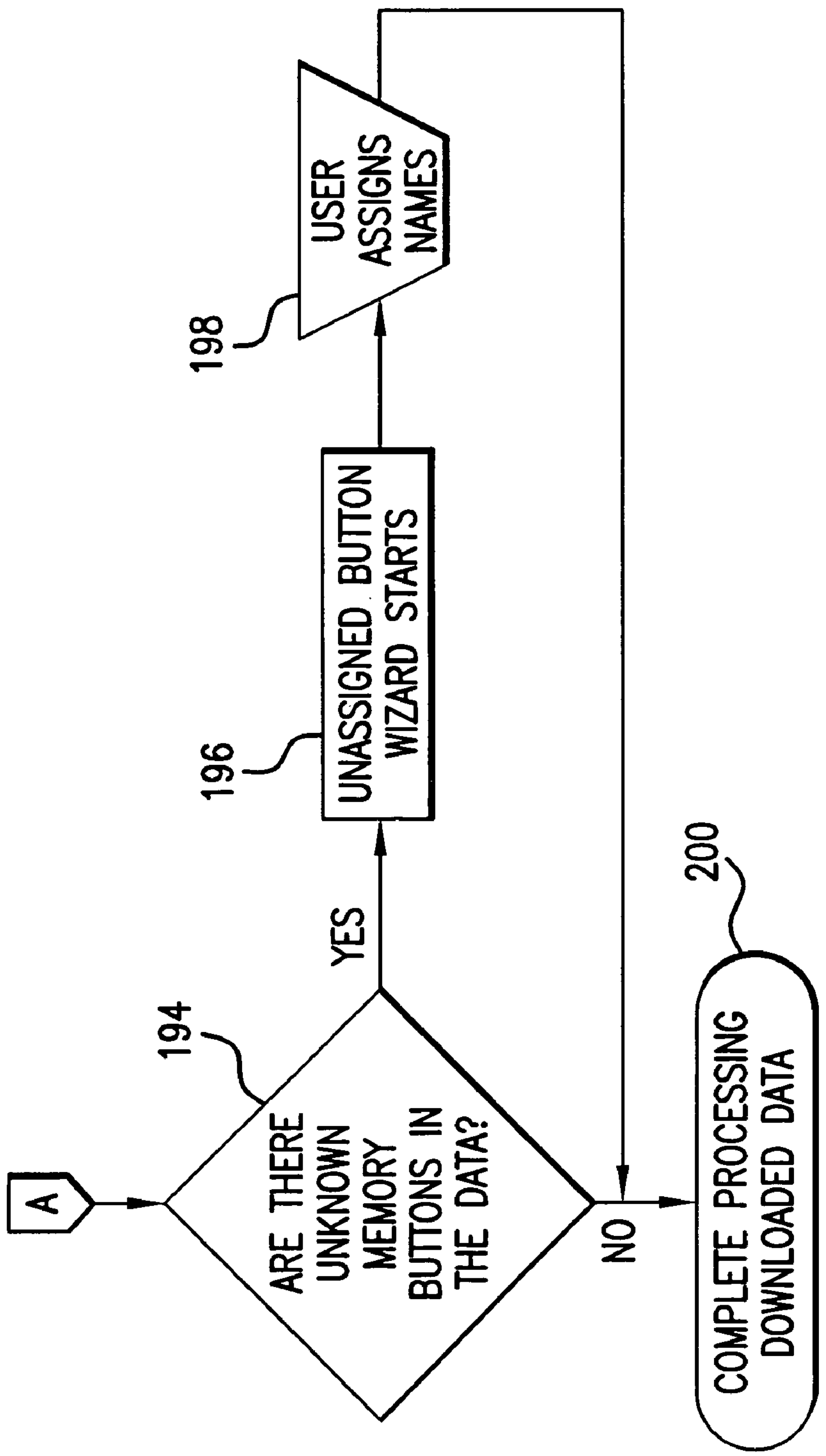

FIG. 9 illustrates the downloading process. An attendant software program, which will be described below, controls the downloading process. To begin downloading, the attendant computer program is run on the computer 168. The guard tour application does not have to be running at the time a download occurs. This is an advantage over other tour systems because it provides enhanced security. The progress of the downloading process depends on whether the downloader (16, 18 or 20) is local or remote 170. If the downloader is local, the officer or guard places the reader in the downloader 172. If the insert detection feature of attendant computer program is enabled 174 the patrol data are downloaded at 178. The insert detection feature allows a user to insert touch button reader 24 into downloader 16 to initiate the downloading process. With less sophisticated systems, a switch or button must be used to initiate downloading once the reader is placed in a downloader. The insert detection feature is also designed to detect third party readers of inferior design. Upon detection of a reader 24 within reader port 32, downloader 16 identifies the specific type of reader detected and employs the correct communication protocol necessary to download guard patrol information to the central computer 14. The downloader 16 is coupled to the central computer 14 by a variety of communication means, including but not limited to, electrical cables, telephone lines, cellular transmission, radio frequency transmission and satellite transmission. If the insert detection is not enabled, the user must initiate the download 176 by selecting the download option from a menu. Once the user has properly initiated the download by the computer, the patrol data are downloaded 178.

If the downloader is at a remote location, the downloading occurs differently. The reader is placed in the downloader at 180 and its data is automatically transferred to the remote downloader at 184. At this point the host computer at 182 may dial the remote downloader or the remote downloader may dial the host computer to establish a connection between same. If the host computer dials the remote downloader, the user initiates the download by selecting the download option from a menu or typing in specific download instructions. Once a connection is established between the host computer and the downloader, the tour data are downloaded to the host computer at 178. Alternatively, the remote system may be configured to dial the host computer. If this is the case, a “command” reader is placed in the downloader’s reader port 32, or a “command” memory button is touched to the downloader’s touch memory button port 30 to instruct the downloader to dial the host computer 186. Other types of readers may require scanning a “dial strip” to initiate dialing from the remote site. The remote downloader will dial the host computer 188 which downloads the patrol data 178.

Figure 11:
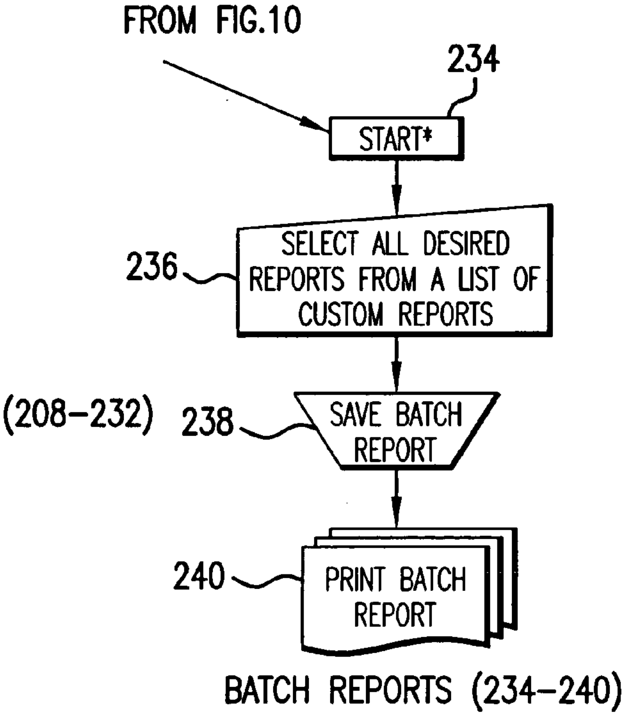
FIG. 11 is a flowchart illustrating the process of generating and printing batch reports using the present invention.

At this point, the remaining steps in the downloading process are the same for both remote and local downloaders. If the guard tour application of the present invention is running 190 or the attendant computer program is configured 202 to start the guard tour system 204 the host computer will begin processing the downloaded data 192. If there are any unknown memory buttons in the data 194 the unassigned button wizard 196 is activated. This will prompt the user to identify such buttons 198. Once any unknown buttons have been identified or if none exist, the downloaded data are processed 200 and reports can be generated (FIGS. 10 and 11).

At any given time the guard tour application may not be running 190, the attendant computer program may not be configured to start the guard tour software 202 or a password may be required to run the guard tour software. If any of these is the case, the data are stored by the host computer for later processing 206.

FIG. 10 shows the procedure for printing reports. In one preferred embodiment of the invention, reports can be printed showing memory button listings as well as reports of the downloaded patrol data. Reports may be divided into basic or advanced report types. To start 208, the user may choose to generate reports for individual downloads or for all downloads that fall within a user-specified range of dates 210. Basic reports are made for one or more selected downloads. To generate these reports, the user either selects the print option from a systems tab 212 (a type of menu option) or from a download properties tab 214, which allows the printing of basic reports with a single mouse click.

This saves considerable time because it requires no prior set up. This method allows printing a report for any single download, groups of downloads, or button listings for specific types of buttons, and technical support information. The user has the option of viewing the report data on-screen before printing 216. The final step is printing the report 218.

The user may choose to print more complex types of reports as necessary. The user can select to print reports by date range 210 to generate these more advanced reports. The user selects the type of report 220 from choices including but not limited to incident reports, officer-location reports, officer-incident-location reports, rule exception reports, and other reports. Next the user can set up options such as date range, appearance and filters 222. A date range can be set by specifying "from" and "to" dates between which all patrol data will be included. Report appearance options include but are not limited to such items as company logos, cover sheets, photographs, detailed headings, watermarks, bitmaps, drawings, illustrations, trademarks and patrol statistics in the reports. A user can also select a report style from a list including but not limited to business, classic, and fax. Filters are set to further refine the patrol data in the reports. With filters, the user can select specific officers, incidents, locations, clients, facilities, groups or other characteristics. Only data appropriate to these selected characteristics are included in the report.

Next, the user has the option of setting up a cover sheet for the reports 224. The user also has the option of defining rules for the specific report 228. Finally, the user can preview the report on-screen 230 and/or print the report 232.

In an embodiment wherein positional information is gathered by means of an integrated positioning system 61 or 81 in association with the reader or downloader, position data can be converted to location information, and can be made available for reports. These reports may be any of those previously mentioned, where location data is substituted for some or all of the memory button or check point data. In another example, a map interface may be provided to permit screen display and printed reports showing the route taken by a patrol in graphic form, which may be used exclusively or in conjunction with an augmenting memory button or checkpoint data.

FIG. 11 illustrates the concept of batch reports. Any custom reports can be selected and saved in a batch report 226 (FIG. 10). This saves considerable time when a group of reports must be printed regularly. To start 234, the user simply selects from a list any custom reports to be included in the batch 236, then assigns a name and saves 238 the batch report. When the batch report is printed 240, all of the reports included in the batch are printed in order without user interaction.

Figure 12:
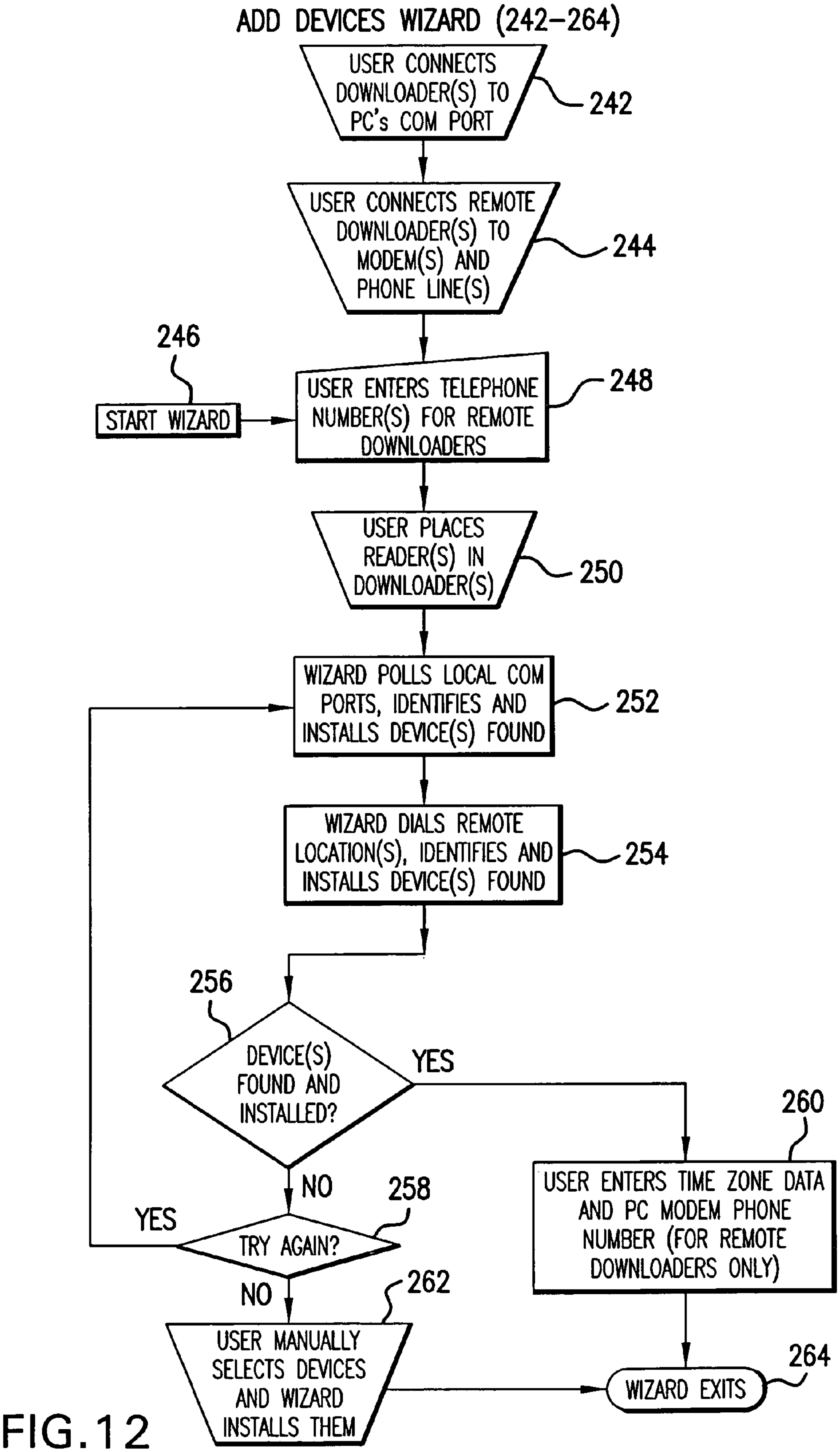
FIG. 12 is a flowchart representing a computer program feature of the present invention used to help add hardware devices to the system.

FIG. 12 illustrates the mechanism in the guard tour system of the present invention for adding readers 24, downloaders (16, 18 or 20), or other devices to the system. The guard tour computer program contains a "wizard" which assists the user in completing the process and automatically installs the added devices to the system. For downloaders connected directly to the central computer 14 (local devices), the user must connect the downloader to the communications port 242 of the central computer 14, insert a reader 24 in each downloader at 250, and then start the "add devices" wizard 246. This wizard polls the local communications ports and identifies and installs the located devices 252. After all devices have been found and installed the user exits the "add devices" wizard 264. If no devices are detected 256 the user may try again by directing the wizard to repeat the process 258.

For remote devices the user must set up the downloader(s) and modem(s) at the remote locations by connecting the downloaders to modems, connecting the modems to the phone lines 244 and placing readers 24 into the downloaders 250. The user then starts the "add devices" wizard 246. The telephone numbers for the remote locations are entered 248. The wizard will dial each location, connect to the remote device and install the devices 254. As with the local devices, if no devices are found, the user can direct the wizard to repeat the process 258. When the remote devices are added to the guard tour system, the user can enter information about the time zone in which each remote device is located and modem phone number for the remote location 260.

At any time the user may manually add devices with help from the add devices wizard 262. This option allows a user to select from a list of supported devices, and assists the user in assigning the correct communications port.

The process by which the present invention automatically scans for, detects and installs devices such as readers and downloaders eliminates many of the problems found in prior art systems particularly finding and assigning communications ports, interrupt requests and understanding specifications of the devices being added. After the devices are added, a description of each device is automatically placed under the appropriate nodes in the hardware hierarchy, as shown in FIG. 6. The user can rename these devices at any time.

Figure 13:
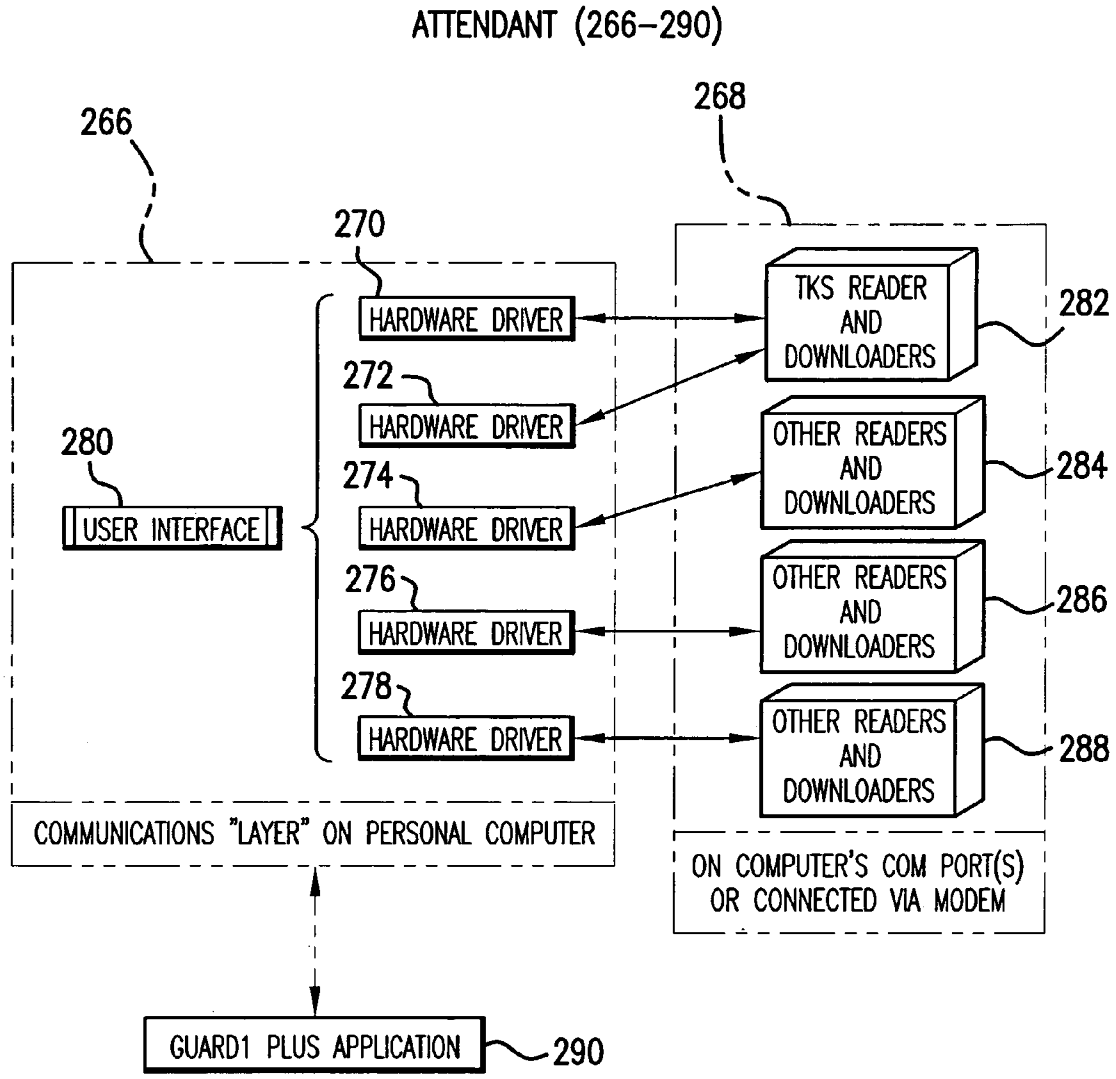
FIG. 13 is a diagram of the attendant computer program component of the present invention.

FIG. 13 shows the internal operation of the attendant computer program component. The attendant computer program 266 provides the communications between the guard tour system application 290 and the external devices 268, i.e., the readers and downloaders. The attendant computer program consists of a user interface 280, and several hardware driver files 270–278. Driver files give the attendant computer program the unique ability to download, clear, set time and date, and perform operations with a variety of readers and downloaders 282–288. The user interface 280 of the attendant computer program allows the user to initiate downloading of both local and remote devices, set options for the program and disable or exit the attendant computer program. The attendant computer program can be set to start when the central computer 14 is started. This makes the attendant computer program available to automatically download readers at all times if the connected devices (downloaders and readers 282–288) support the insert detect feature.

Figure 14:
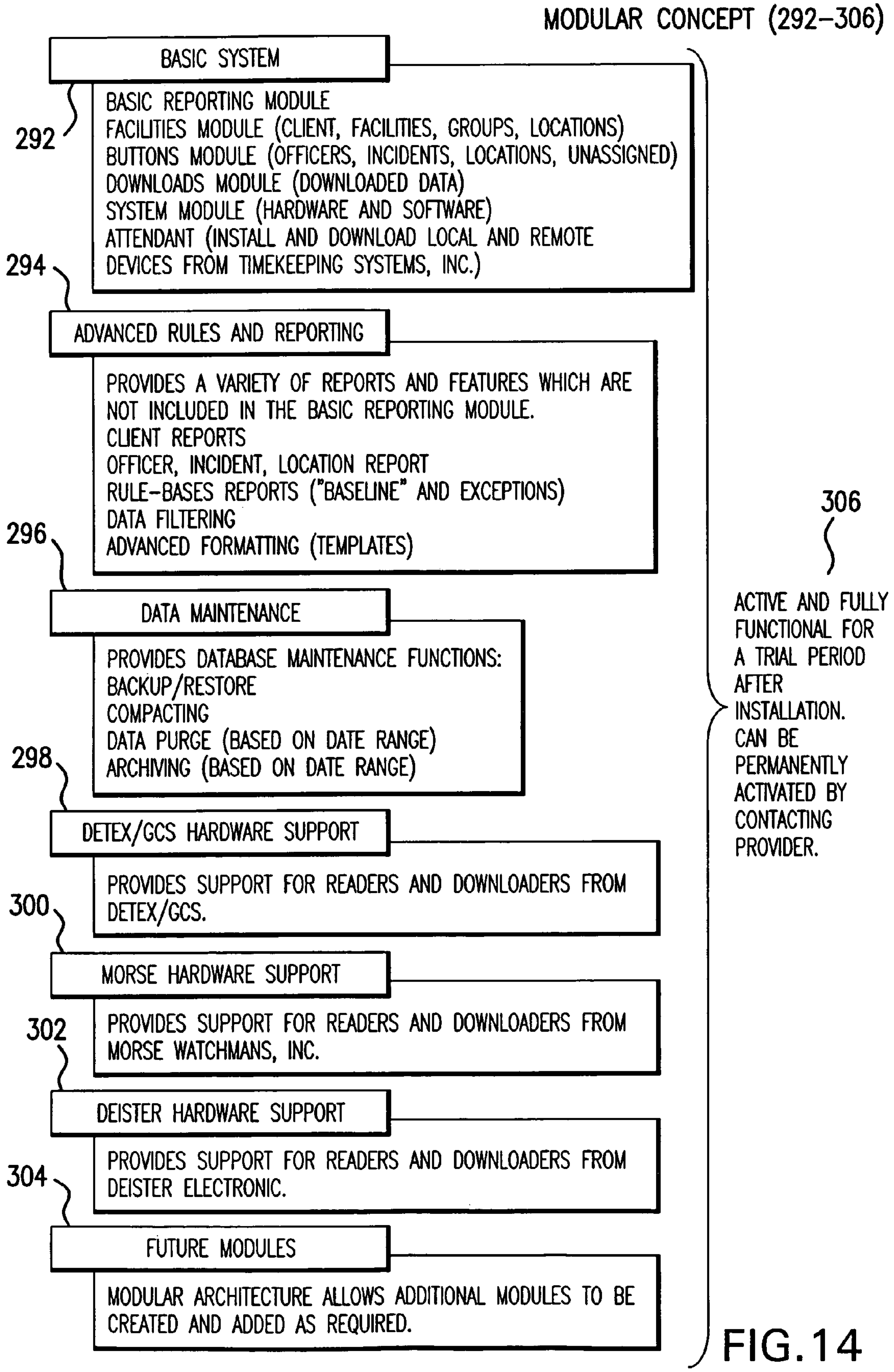
FIG. 14 is a chart illustrating the modular design of a preferred embodiment of the present invention.

FIG. 14 illustrates the modular nature of the guard tour system of the present invention. Types of modules include but are not limited to basic system 292, advanced rules and reporting 294, data maintenance 296, and third party hardware support 298–302. The basic system includes features such as a facilities module for client, facilities, groups and locations information; a buttons module; a downloads module for the downloaded data; a system module for the hardware and software; and a module for the attendant software. The advanced rules and reporting module provides a variety of reports and features which are not included in the basic system such as client reports, officer/incident/location reports, rules based reporting (showing the baseline rule and exceptions), data filtering and advanced formatting using predefined templates for reports. The data maintenance module provides database maintenance functions including backup/restore, compacting, data purge and archiving. The third party and/or competitor hardware support provides features for use with readers and downloaders manufactured by different companies. Further, the modular construction allows additional software modules or features to be created and added as they are developed 304.

A user may activate one or more modules by obtaining an activation code from the provider of the system. Once a module is activated, it can be used without restriction on a computer 306. It is also contemplated by the present invention that end users of the system can obtain these modules on various software media or via the Internet, and they can be installed without replacing the complete system.

FIG. 15 shows the process of creating a "Rule". The concept of rules resolves a common problem in establishing accountability among the officers or guards making patrols by determining the number of times a location was visited in a given time period. This is done by eliminating the concept of "tours," which force the officer to log in to start a tour and are generally rigid in the route requirements. Rules are much more flexible in that their processing is done dynamically. Rules are "data-centric" rather than "tour-centric." This allows the "Rule" to be compared to the number of visits in the patrol data over a given time span. As additional patrol data are collected, the "Rule" can be reprocessed at any time to account for the new data. An example of a "Rule" is as follows: A client requires every location at one of its facilities to be read twice each weekday between 12:00 a.m. and 6:30 a.m. A second rule for the same client requires five locations to be read once every hour on Saturdays and Sundays. These rules are set up in the computer program. As patrol data are collected and downloaded, reports can be printed that list any exceptions to these rules. Examples of exceptions would be a location that was not read for a two hour period on a Sunday, or a location that was read only once between 12:00 a.m. and 6:30 a.m. on a Tuesday. These would appear on a Rule Exception report for that client. Another advantage of Rules is that they allow a guard to investigate unusual occurrences without violating rigid tour route requirements. This method allows guards to effectively do their jobs with more flexibility than previous systems.

In an embodiment of the present invention, the user starts 308 by assigning a name to the Rule 310. Next, the user assigns the dates for which the Rule is valid 312. A Rule can be valid from the date it is created forward, or a date can be specified from which the rule is valid. The rule can also be assigned a date after which the rule will expire.

A user then determines the schedules for the rules 314. Rules can be scheduled for every day 316, which means that the Rule will apply every day of the week. Rules can also be made to apply on specific days of the week 318. For example, a particular Rule may only apply on Tuesdays, Wednesdays, Fridays, and Sundays. Rules may also be set for specific days of the month 320, for example the second day of every month, the third Monday of every month or the last day of every month. Next, the user sets the time period for the Rule 322. As a default, the Rule is always in effect, but this can be modified by the user. For example the user may make a Rule effective only between midnight until 6 a.m.

Next, the details for the Rule are confirmed. The user sets the required number of reads for each location on the patrol 324. When Rules are processed by the system, any and all locations which are read fewer than the required number, within the date and time ranges scheduled for a given Rule, cause an exception to be reported.

Finally, the user can add a map of the patrol 326 to the Rule. This could be a graphic showing the route for the individual or mobile patrol, the route to the client's location or any other map applicable to the patrol. The map can be printed and taken by the guard as he or she makes the patrol, to help avoid missed locations. This is especially helpful when training new officers or when the patrol is complex. The rule is then saved 328. In an embodiment wherein positional information is gathered by means of a positioning system 61 or 81 integrated into the reader or downloader, the position data may be processed and checked against a rules database in a similar manner. Data which meets certain criteria, such as being recorded within a predetermined distance from a defined location, may also be converted into location information. Violations of rules may be handled in a manner similar to the handling of other rules, and the application could generate a violation if there is no change in position for a user-specified number of minutes. As an example, rules may include defining the minimum/maximum time from previous location, defining the maximum permitted deviation from a prescribed route, defining the maximum time for stops wherein there is no position change for a predetermined amount of time, defining the maximum speed limit of the vehicle or in relation to other operational characteristics of the vehicle, or various other rules with which position information may be correlated. As an example, the reader may be placed in a vehicle and may record the position of the vehicle continually or periodically. The information can be downloaded and analyzed, and the analysis may be performed against a set of predetermined rules, such as described above, wherein violation of a rule causes an exception which can be flagged according to a severity level assigned by the user. For example, upon violation of a rule, the system may be set up to notify immediately upon downloading, display on a printed report, or provide a warning only. Other suitable analysis and use of the position information is also contemplated. The location data will enable supervisory personnel to determine if a guard or vehicle was present at a specific location at a specific times, followed a prescribed route, did or did not make unauthorized stops, did or did not stop for an excessive amount of time, did or did not exceed the speed limit, did or did not exceed predetermined operational characteristics of the vehicle or like evaluations.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention as defined in the claims. Within the claims, means-plus-function language is intended to cover the structures described in the present application as performing the recited function, and not only structural equivalents but also equivalent structures. The written description and drawings illustrate the present invention and are not to be construed as limited to the specific embodiments disclosed. Modifications to the disclosed embodiments, as well as other embodiments, are included within the scope of the claims. The present invention is defined by the following claims, including equivalents thereof.

What is claimed is:

1. A computerized method of monitoring and evaluating guard patrols of one or more sites, comprising the steps of:

a) defining at least one checkpoint to identify at least one location to be patrolled by a guard;

b) defining at least one patrol record to compile information relating to said at least one location to be patrolled by the guard;

c) providing a positioning system to generate data relating to the location of the guard to be included as part of said information;

d) detecting said information obtained from said positioning system and said at least one location patrolled by the guard;

e) storing said information within said at least one patrol record; and using said information to monitor and evaluate the guard patrol and the location of the guard when on a guard patrol.

2. The method according to claim 1, wherein said step b comprises programming a computer with information describing records including said data relating to the location of the guard when on a guard patrol.

3. The method according to claim 1, wherein the data relating to the location of the guard when on a guard patrol is stored within said at least one patrol record and is displayed in a graphical form to show the route of a guard patrol.

4. The method according to claim 1, wherein said positioning system comprises a global positioning system receiver.

5. The method according to claim 1, wherein said positioning system comprises a cellular transmission system.

6. The method according to claim 1, wherein said positioning system is adapted to be configured within a downloader device.

7. The method according to claim 1, wherein said positioning system is adapted to be configured within a reader device.

8. The method according to claim 1, wherein said positioning system comprises a local area positioning system.

9. The method according to claim 7, wherein said reader device is carried by the guard when on a guard patrol and provides information selected from the group consisting of guard location information, guard tour information, guard route information, or combinations thereof.

10. The method according to claim 1, wherein said positioning system is mounted in a vehicle used by the guard when on a guard patrol and provides information selected from the group consisting of vehicle position location information, vehicle path, vehicle speed, vehicle route information, or combinations thereof.

11. The method according to claim 1, wherein said positioning system provides data relating to the location of the guard when on a guard patrol selected from the group consisting of continuous position information, position information acquired at predetermined time or distance intervals, on demand position information, and combinations thereof.

12. The method according to claim 1, wherein said data relating to the location of the guard when on a guard patrol is analyzed with reference to a set of predetermined rules.

13. The method according to claim 12, wherein a violation of a said predetermined rule causes an exception condition to be generated.

14. The method according to claim 12, wherein said set of predetermined rules is selected from a group consisting of minimum/maximum time from a previous location, maximum permitted deviation from a prescribed route, maximum time for stops, maximum speed limit, and combinations thereof.

15. A data processing system for monitoring and evaluating guard patrols of one or more sites comprising:

a) a central computing device;

b) a device for gathering information obtained from one or more checkpoints during a guard patrol by a guard of one or more sites, said information gathering device comprising a positioning system for generating data relating to the location of the guard at any time when on a guard patrol; and c) a system for downloading said information into said central computing device.

16. The system according to claim 15, wherein said positioning system is selected from the group consisting of a global positioning system receiver, a cellular communication network, a local positioning system, and combinations thereof.

17. The system according to claim 15, wherein said positioning system is adapted to be configured within said downloading system.

18. A computer program product for use with a data processing system for monitoring and evaluating guard patrols of one or more sites, said computer program product comprising:

a) a computer usable medium having computer readable program code means therein to gather information from a positioning system relating to the location of a guard when on a guard patrol of one or more sites; and b) a computer usable medium having computer readable program code means therein to selectively download said information into said data processing system.

19. The computer program product according to claim 18, wherein said positioning system is selected from the group consisting of a global positioning system receiver, a cellular communication network, a local positioning system, and combinations thereof.

20. The computer program product according to claim 18, further including computer readable program code means for defining at least one patrol record on a said computer readable medium to compile information from said positioning system relating to the location of a guard when on a guard patrol.

21. The computer program product according to claim 20, where said information relating to the guard patrol record is comprised of information selected from the group consisting of officer records, incident records, location records, clients, facilities, groups, locations, times at locations, routes, vehicle position, vehicle speed, and combinations thereof.

22. The computer program product according to claim 20, further including computer readable program code means for displaying said at least one patrol record and at least a map showing the route of the guard when on said guard patrol.

23. A method of applying rules for performing a guard patrol of one or more sites, the method comprising the steps of:

a) acquiring information from a positioning system which generates data relating to the location of a guard when on a guard patrol;

b) defining rules relating to performing a guard patrol, and c) analyzing data from a guard patrol of a site based upon said location information of a guard when on a guard patrol to determine compliance with said rules.

24. The method according to claim 23, wherein said rules are selected from the group consisting of the minimum time from a previous location, maximum time from a previous location, maximum permitted deviation from a prescribed route, maximum time for stops, maximum speed limit, and combinations thereof.

25. The method according to claim 23, further including the step of determining at least one time range during which said rule is effective.

26. The method according to claim 23, further including the step of reporting an exception when a said defined rule is violated.

27. A data processing system for monitoring and evaluating guard patrols of one or more sites comprising:

a) a central computing device;

b) a device for gathering information obtained from one or more checkpoints during a guard patrol of one or more sites, said information gathering device comprising a positioning system for generating data relating to the location of a guard when on a guard patrol, a reader having a memory device in which said information is stored, and a downloader having a reader port that detects the placement of said reader within said reader port, wherein said downloader identifies the specific type of reader detected and implements the proper communication protocol for the specific type of reader to download said information to said central computing device; and c) a system for downloading said information into said central computing device.

28. The system according to claim 27, wherein said positioning system is adapted to be configured within said reader.

29. A data processing system for monitoring and evaluating guard patrols of one or more sites comprising:

a) a central computing device;

b) a device for gathering information obtained from one or more checkpoints during a guard patrol of one or more sites, said information gathering device comprising a positioning system for generating data relating to the location of a guard when on a guard patrol, a reader having a memory device in which said information is stored, and a downloader having a reader port that detects the placement of said reader within said reader port, wherein said downloader identifies the specific type of reader detected and implements the proper protocol for the specific type of reader to download said information to said central computing device and wherein said downloader is coupled to said central computing device by a communication means selected from the group consisting of electrical cables, telephone lines, infrared transmission, cellular transmission, the Internet, radio frequency transmission and satellite transmission; and c) a system for downloading said information into said central computing device.

30. A data processing system for monitoring and evaluating guard patrols of one or more sites comprising:

a) a central computing device;

b) a device for gathering information from one or more checkpoints during a guard patrol by a guard of one more sites, said information gathering device comprising a positioning system for generating data relating to the location of the guard when on a guard patrol and for automatically generating data relating to the location of the guard at any time when on a guard patrol at periodic intervals; and c) a system for downloading said information into said central computing device.

* * * * *